(12) United States Patent
Tin

(10) Patent No.: US 8,610,948 B2
(45) Date of Patent: Dec. 17, 2013

(54) SPECTRAL GAMUT MAPPING BY CONSTRAINED SUBDIVISION OF GAMUT

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 12/625,552

(22) Filed: Nov. 24, 2009

(65) Prior Publication Data

US 2011/0122426 A1 May 26, 2011

(51) Int. Cl.
*G06F 15/00* (2006.01)

(52) U.S. Cl.
USPC ............ 358/1.9; 358/509; 358/518; 358/523; 382/162; 382/166; 382/167

(58) Field of Classification Search
USPC ........... 358/1.9, 509, 518–523; 382/162, 166, 382/167
See application file for complete search history.

(56) References Cited

U.S. PATENT DOCUMENTS

| | | | |
|---|---|---|---|
| 5,583,666 A | 12/1996 | Ellson et al. | |
| 5,687,000 A * | 11/1997 | Nakaoka | 358/296 |
| 5,892,891 A | 4/1999 | Dalal et al. | |
| 6,342,951 B1 | 1/2002 | Eschbach et al. | |
| 6,698,860 B2 | 3/2004 | Berns et al. | |
| 6,719,392 B2 | 4/2004 | Qiao | |
| 6,744,534 B1 | 6/2004 | Balasubramanian et al. | |
| 6,888,648 B2 * | 5/2005 | Odagiri et al. | 358/1.9 |
| 7,177,047 B2 | 2/2007 | Rozzi | |
| 7,342,593 B2 | 3/2008 | Agar | |
| 7,382,379 B1 | 6/2008 | Edge et al. | |
| 2005/0018226 A1* | 1/2005 | Chiba | 358/1.9 |
| 2005/0094871 A1 | 5/2005 | Berns et al. | |
| 2005/0111017 A1 | 5/2005 | Takahashi et al. | |
| 2005/0163370 A1 | 7/2005 | Minakuti et al. | |
| 2006/0110031 A1 | 5/2006 | Bala et al. | |
| 2006/0285742 A1 | 12/2006 | Arai et al. | |
| 2007/0121132 A1 | 5/2007 | Blinn et al. | |
| 2007/0291312 A1 | 12/2007 | Kaneko et al. | |
| 2008/0117444 A1 | 5/2008 | Stokes | |

(Continued)

FOREIGN PATENT DOCUMENTS

WO      2005-043884      5/2005

OTHER PUBLICATIONS

F. Nakaya, et al., "Spectral encoding/decoding using LabRGB", Society for Imaging Science and Technology, 2007, pp. 190-194.

(Continued)

*Primary Examiner* — Qian Yang
*Assistant Examiner* — Martin Mushambo
(74) *Attorney, Agent, or Firm* — Fitzpatrick, Cella, Harper & Scinto

(57) ABSTRACT

Color management in which a spectral gamut is determined for spectral gamut mapping by constructing subdivisions of a set of samples spanning the spectral gamut. The samples are designated by specifying device values and are subdivided based on their lightness, chroma and hue under a reference illuminant such that the number of samples in each subdivision is limited by a predetermined number. A color value to be spectrally gamut mapped is accepted, and converted into a colorimetric value under the reference illuminant. The converted colorimetric value includes a lightness, a chroma and a hue. Subdivisions within a tolerance of the converted colorimetric value are identified using its lightness, chroma and hue. Samples within the identified subdivisions are searched to find a sample that matches acceptably to the color value relative to an objective function.

40 Claims, 29 Drawing Sheets

(56) References Cited

U.S. PATENT DOCUMENTS

| | | |
|---|---|---|
| 2008/0137941 A1 | 6/2008 | Tin |
| 2008/0239417 A1 | 10/2008 | Tsutsumi |
| 2008/0246982 A1 | 10/2008 | Kaneko et al. |
| 2009/0141321 A1 | 6/2009 | Tin |
| 2009/0141322 A1 | 6/2009 | Tin |
| 2009/0141970 A1 | 6/2009 | Tin |
| 2009/0148040 A1 | 6/2009 | Tin |
| 2009/0185200 A1 | 7/2009 | Tin |

OTHER PUBLICATIONS

M. Derhak, et al., "Spectral Colorimetry Using LabPQR—An Interim Connection Space", IS&T/SID Twelfth Color Imaging Conference, 2006, pp. 246-250.

B. Bastani, et al, "Spectral Gamut Mapping and Gamut Concavity", Society for Imaging Science and Technology, 2007, pp. 218-221.

S. Tsutsumi, et al., "Spectral Reproduction using LabPQR: Inverting the Fractional-Area-Coverage-to-Spectra Relationship", Proc. International Congress of Imaging Science, 2006.

S. Tsutusumi, et al., "Spectral Color Reproduction Using an Interim Connection Space-Based Lookup Table", Journal of Imaging Science and Technology 52(4), 2008, pp. 040201-1 to 040201-13.

R. Kimmel, et al., "Space-Dependent Color Gamut Mapping: A Variational Approach", IEEE Transactions on Image Processing, vol. 14, No. 6, 2005, pp. 796-803.

Y. Chen, et al., "Extending Printing Color Gamut by Optimizing the Spectral Reflectance of Inks", IS&T/SIC 12th Color Imaging Conference, 2004, pp. 163-169.

Y. Chen, et al., "Multi-Ink Color-Separation Algorithm Improving Image Quality", Journal of Imaging Science and Technology 52(2), 2008, pp. 020604-1 to 020604-9.

U.S. Appl. No. 12/260,916, filed Oct. 29, 2008, Applicant: Siu-Kei Tin.

U.S. Appl. No. 12/435,397, filed May 4, 2009, Applicant: Siu-Kei Tin.

U.S. Appl. No. 12/435,402, filed May 4, 2009, Applicant: Siu-Kei Tin.

U.S. Appl. No. 12/538,829, filed Aug. 10, 2009, Applicant: Siu-Kei Tin.

\* cited by examiner

◇ 0 - dimensional stratum ($n_0 = 1$)
○ 1 - dimensional strata ($n_1 = 20$)
□ 2 - dimensional stratum ($n_2 = 4$)

|  | LAB(D50) | LAB(D65) | LAB(A) | LAB(F2) | LAB(F7) | LAB(F11) | OBJ2 |
|---|---|---|---|---|---|---|---|
| SAMPLE 1 | | | | | | | |
| SAMPLE 2 | | | | | | | |
| SAMPLE 3 | | | | | | | |
| ⋮ | | | | | | | |

FIG. 14

SPECTRAL GAMUT MAPPING BY CONSTRAINED SUBDIVISION OF GAMUT

FIELD

The present disclosure relates to the field of color management, and more particularly relates to spectral gamut mapping.

BACKGROUND

Color management controls the color conversion of a color image from a source device to a destination device, such as from an image scanner or digital camera to a color printer or monitor. In color management, there is often a mismatch between the gamut of colors available to the source device and the gamut of colors available to the destination device. The adjustment for this gamut mismatch is referred to as gamut mapping.

Conventional gamut mapping is typically performed in a colorimetric color space which is three-dimensional. Examples of colorimetric color spaces in which conventional gamut mapping may be performed include CIEXYZ color space or CIELAB color space. The appearance of a reproduction resulting from such colorimetric color management is dependent on viewing conditions. In particular, the appearance of the reproduction may not match the original when the reproduction is viewed under a light source different from that assumed in conventional gamut mapping.

More recently, spectral color management has been considered. Spectral color management is advantageous over colorimetric color management, in that spectral color management uses spectral reflectance data that includes far more information than colorimetric data to represent the original color. In comparison to three-dimensional colorimetric data, spectral reflectance data will often use 31 dimensions or more to represent the spectral reflectance of a color stimulus. For spectral reflectance data using 31 dimensions, each of the 31 dimensions corresponds to a reflectance for a wavelength at 10 nm intervals in the visible wavelength spectrum of 400 nm to 700 nm. Accordingly, the use of spectral reflectance data in spectral color management usually results in a color reproduction with a better color match under arbitrary illuminants than a reproduction resulting from colorimetric color management.

SUMMARY

Although spectral color management ordinarily produces a better color reproduction than colorimetric color management, the computational complexity of spectral color management is often too demanding to make spectral color management practical for currently available computing hardware, such as programmed general purpose computers. In particular, conventional gamut mapping algorithms are typically associated with operations (e.g., convex hulling) having a complexity that depends exponentially on the dimension of the data used to represent the colors. In practice, performing these algorithms using the relatively high dimension of spectral reflectance data can result in increased memory requirements and lengthy computational times when compared to performing such algorithms when using three-dimensional colorimetric data.

In keeping with the above concerns, the present disclosure involves use of a constrained subdivision of a set of samples spanning a device's spectral gamut to reduce the computational complexity typically associated with spectral color management. The subdivisions of the set of samples are constrained in the sense that the subdivisions are defined using a colorimetric space under a reference illuminant so that each subdivision is constrained by the colorimetry under the reference illuminant. A color value in a color space is spectrally gamut-mapped by first identifying subdivisions within a tolerance of the color value's corresponding colorimetric value under the reference illuminant. The samples within the identified subdivisions are then searched for a sample that matches acceptably to the color value relative to an objective function.

According to one aspect described herein, constructing the subdivisions and spectral gamut mapping involve an off-line phase and an on-line phase, respectively. These phases might be performed at distinctly different times and by distinctly different entities. For example, the off-line phase might be performed by a device manufacturer and the on-line phase might be performed by an end-user of the device.

In the off-line phase, a spectral gamut of a device is determined by constructing plural subdivisions of a set of samples spanning the spectral gamut. The set of samples is designated by specifying plural device values in a device color space. A spectral reflectance array is generated for each sample using the device value corresponding to the sample. A colorimetric value for each sample is generated by transforming the spectral reflectance array corresponding to the sample under a reference illuminant. The colorimetric value includes a lightness in a lightness dimension, a chroma in a chroma dimension and a hue in a hue dimension. The set of samples are subdivided into subdivisions based on the lightness, the chroma and the hue of the samples such that the number of samples in each subdivision is limited by a predetermined number.

In the on-line phase, to spectrally gamut-map a color value in a color space, the color value is accepted and then converted into a colorimetric value under the same reference illuminant as in the off-line phase. The converted colorimetric value includes a lightness in the lightness dimension, a chroma in the chroma dimension and a hue in the hue dimension. Subdivisions of the set of samples which fall within a tolerance of the converted colorimetric value are identified by using the lightness, the chroma and the hue of the converted colorimetric value. The samples within the identified subdivisions are searched so as to find a sample that matches acceptably to the accepted color value relative to an objective function. The device value for this sample is then provided to the device.

The use of constrained subdivisions described above ordinarily reduces the computational complexity typically associated with spectral color management. More specifically, the identification of subdivisions allows for control of the number of samples searched so that computational complexity is ordinarily reduced. Put another way, samples in subdivisions beyond the tolerance are poor matches at the reference illuminant, and therefore cannot yield good spectral matches. Thus, the identification of subdivisions within the tolerance provides samples that are good candidates for a spectral match, for the reason that they are already good matches at the reference illuminant. Only this relatively few number of candidates need to be searched using the objective function in order to find a sample which matches acceptably to the accepted color.

In one aspect, the set of samples are subdivided into subdivisions based on a neutral spine and hue leaves in a lightness-chroma-hue (LCh) space.

According to another aspect, the searching can include finding a sample in the identified subdivisions yielding the lowest result for the objective function.

According to another aspect, the objective function can be equal to a maximum value among multiple values resulting from a color difference equation evaluated under multiple illuminants for the accepted color value and for a spectral reflectance array of a given sample in an identified subdivision.

According to yet another aspect, the objective function can be equal to a maximum value among multiple values resulting from a color inconstancy index evaluated from multiple illuminants to the reference illuminant for a spectral reflectance array of a given sample in an identified subdivision.

According to another aspect, if the acceptably matching sample does not match to the accepted color value to within a pre-designated tolerance relative to the objective function, new samples are designated by specifying new device values in the device color space that are within a neighborhood of the device value of the acceptably matching sample. The new samples can then be searched for a sample with a better match.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 14 is a diagram illustrating the layout of the auxiliary computational data structure according to an example embodiment.

DETAILED DESCRIPTION

Figure 1:
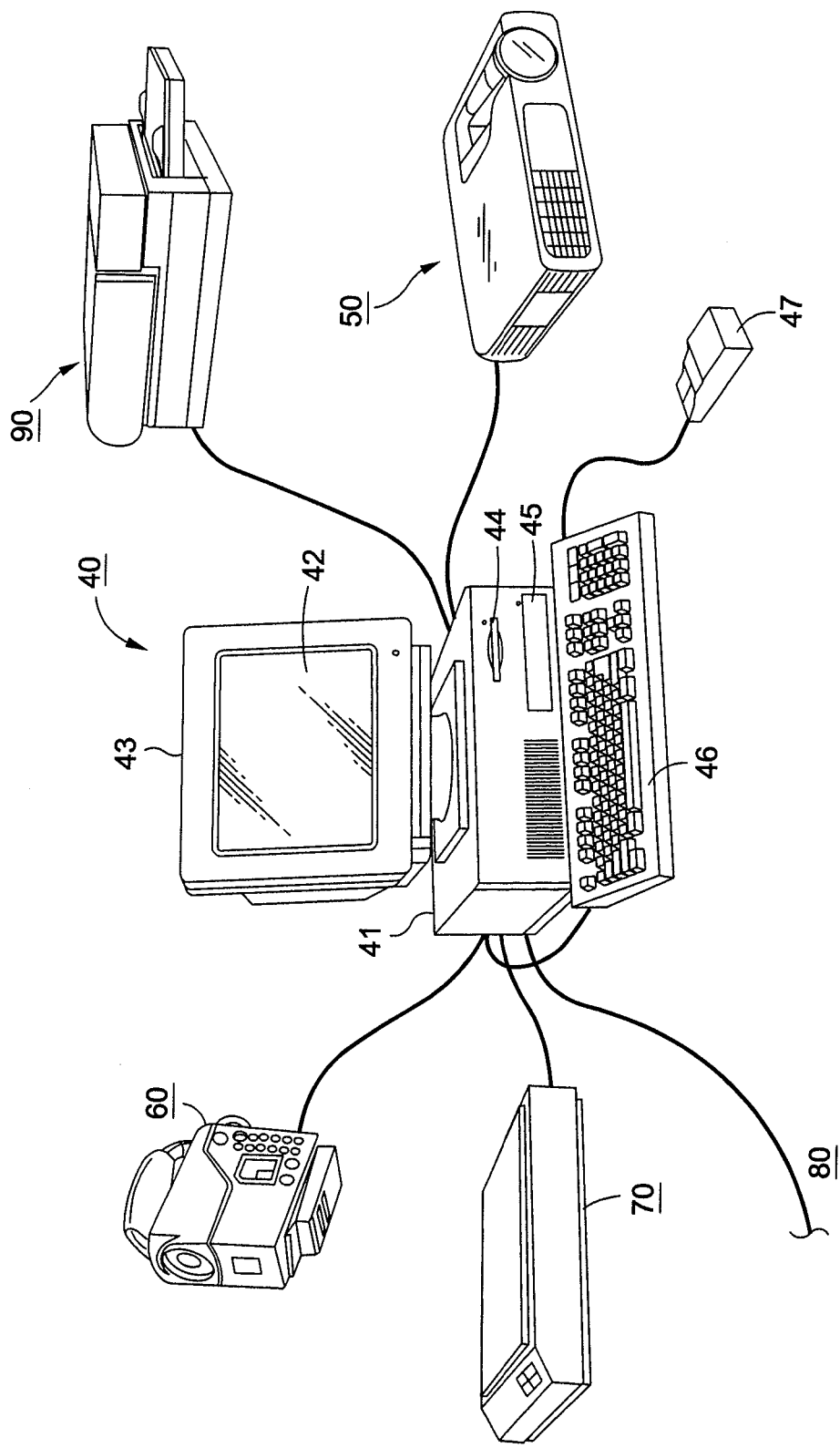
FIG. 1 is a representative view of computing equipment relevant to an example embodiment.

FIG. 1 is a representative view of computing equipment, peripherals and digital devices, relevant to an example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disc drive 44, which are constructed to store computer-readable information such as computer-executable process steps. DVD disc drive 44 provides a means whereby host computer 41 can access information, such as image data, computer-executable process steps, application programs, etc. stored on removable memory media. In addition, information can also be retrieved through other computer-readable media such as a USB storage device connected to a USB port (not shown), or through network 80. Other devices for accessing information stored on removable or remote media may also be provided.

Multi-ink printer 90, such as a CMYKRG printer, is a first example of a color output device capable of spectral color reproduction. In this example, printer 90 is provided for forming color images in accordance with image data from host computer 41 onto a medium such as paper.

Multispectral camera 60 is a first example of a color input device capable of spectral capture, and is provided for sending spectral image data to host computer 41. Multispectral scanner 70 is a second example of a color input device capable of spectral capture, and is provided for scanning documents and images and sending the corresponding spectral image data to host computer 41.

Of course, host computer 41 may acquire spectral image data from other sources such as a digital video camera, a local area network or the Internet via network 80. Likewise, host computer 41 may interface with other color output devices, such as color output devices accessible over network 80.

Figure 2:
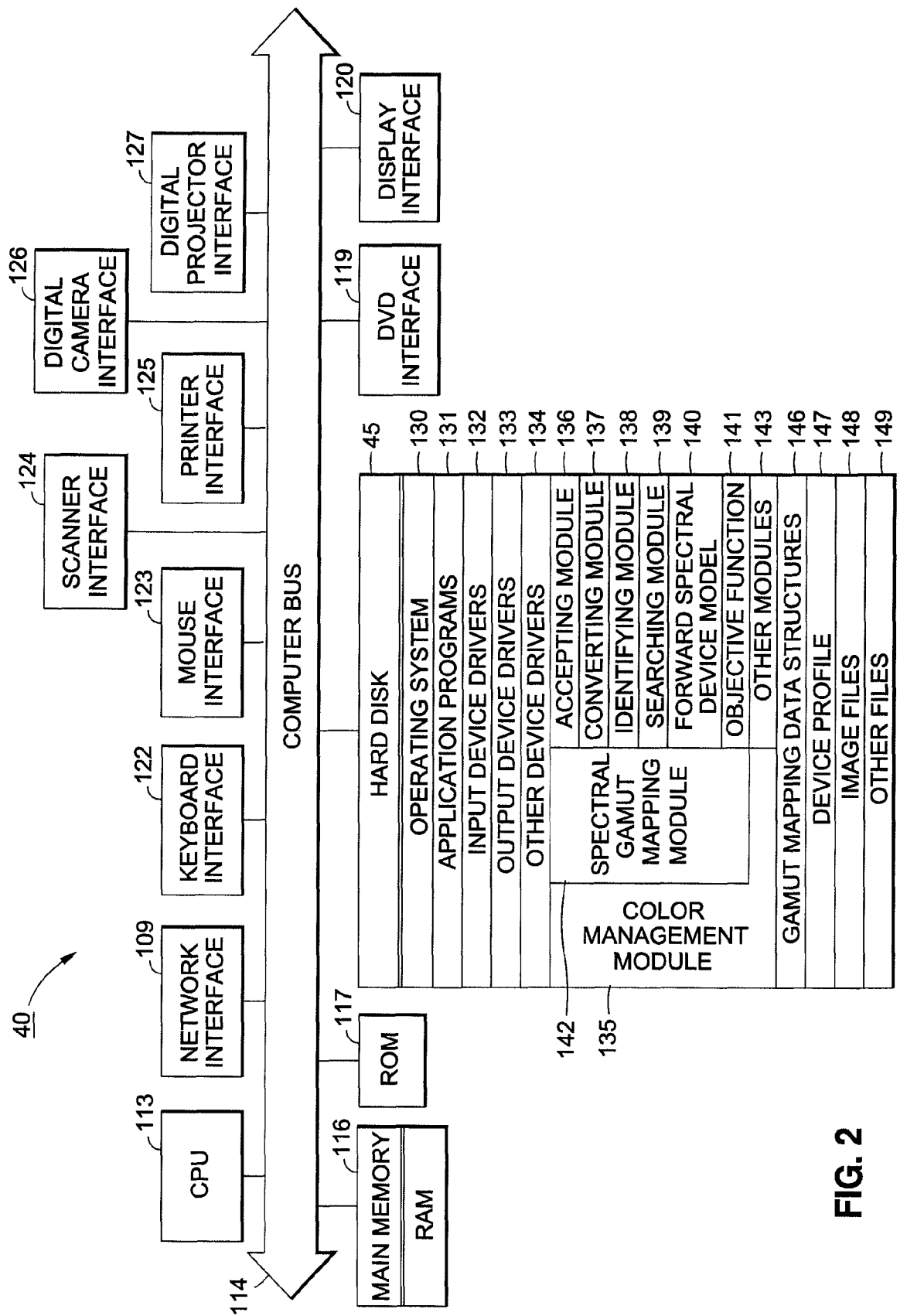
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 113 which interfaces with computer bus 114. Also interfacing with computer bus 114 are hard disk 45, network interface 109, random access memory (RAM) 116 for use as a main run-time transient memory, read only memory (ROM) 117, DVD disc interface 119 for DVD disc drive 44, display interface 120 for monitor 43, keyboard interface 122 for keyboard 46, mouse interface 123 for pointing device 47, scanner interface 124 for scanner 70, printer interface 125 for printer 90, digital camera interface 126 for multispectral camera 60, and digital projector interface 127 for digital projector 50.

RAM 116 interfaces with computer bus 114 so as to provide information stored in RAM 116 to CPU 113 during execution of the instructions in software programs such as an operating system, application programs, color management modules, and device drivers. More specifically, CPU 113 first loads computer-executable process steps from hard disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, hard disk 45 contains operating system 130, application programs 131, such as word processing programs or graphic image management programs. Hard disk 45 also contains device drivers for software interface to devices, such as input device drivers 132, output device drivers 133, and other device drivers 134. Image files 148, including color image files, and other files 149 are available for output to color output devices and for manipulation by application programs.

Color management module (CMM) 135 includes spectral gamut mapping module 142 and other modules 143 for managing colors that are transferred from a source device to a destination device, such as the transfer of color image data from an image capture by multispectral camera 60 to a printout by multi-ink printer 90. CMM 135 may be configured as a part of operating system 130, as part of a device driver (e.g., printer driver, digital camera driver), or as a stand-alone application program. It may also be configured as a plug-in or dynamic link library (DLL) to the operating system, device driver or application program. For example, CMM 135 according to example embodiments, may be incorporated in an input/output device driver for execution in a computing device, embedded in the firmware of an input/output device, or provided in a stand-alone color management application for use on a general purpose computer. In one example embodiment described herein, CMM 135 is incorporated directly into the operating system for general purpose host computer 41. It can be appreciated that the present disclosure is not limited to these embodiments and that the disclosed color management module may be used in other environments in which color management is used.

As shown in FIG. 2, for the purpose of spectral color management, CMM 135 includes spectral gamut mapping module 142. Spectral gamut mapping module 142 includes accepting module 136, converting module 137, identifying module 138, searching module 139, forward spectral device model 140 and objective function 141. In this embodiment, each module of spectral gamut mapping module 142 comprises computer-executable process steps stored on hard disk 45 to allow spectral gamut mapping module 142 to convert color values corresponding to colors of an image from the source device to the destination device. In doing so, spectral gamut mapping module 142 performs spectral gamut mapping for reproducing an image on the destination device using gamut mapping data structures 146 and device profile 147.

Gamut mapping data structures 146 and device profile 147 are files generated during an off-line phase typically occurring in a device profiling process at a device manufacturer's facility. Such files can be stored to a computer readable memory medium and shipped to a user of host computer 41 for installation onto hard disk 45. During an on-line phase, such as when the user initiates a printing request on host computer 41, such files can be retrieved and used in spectral color reproduction.

Figure 3:
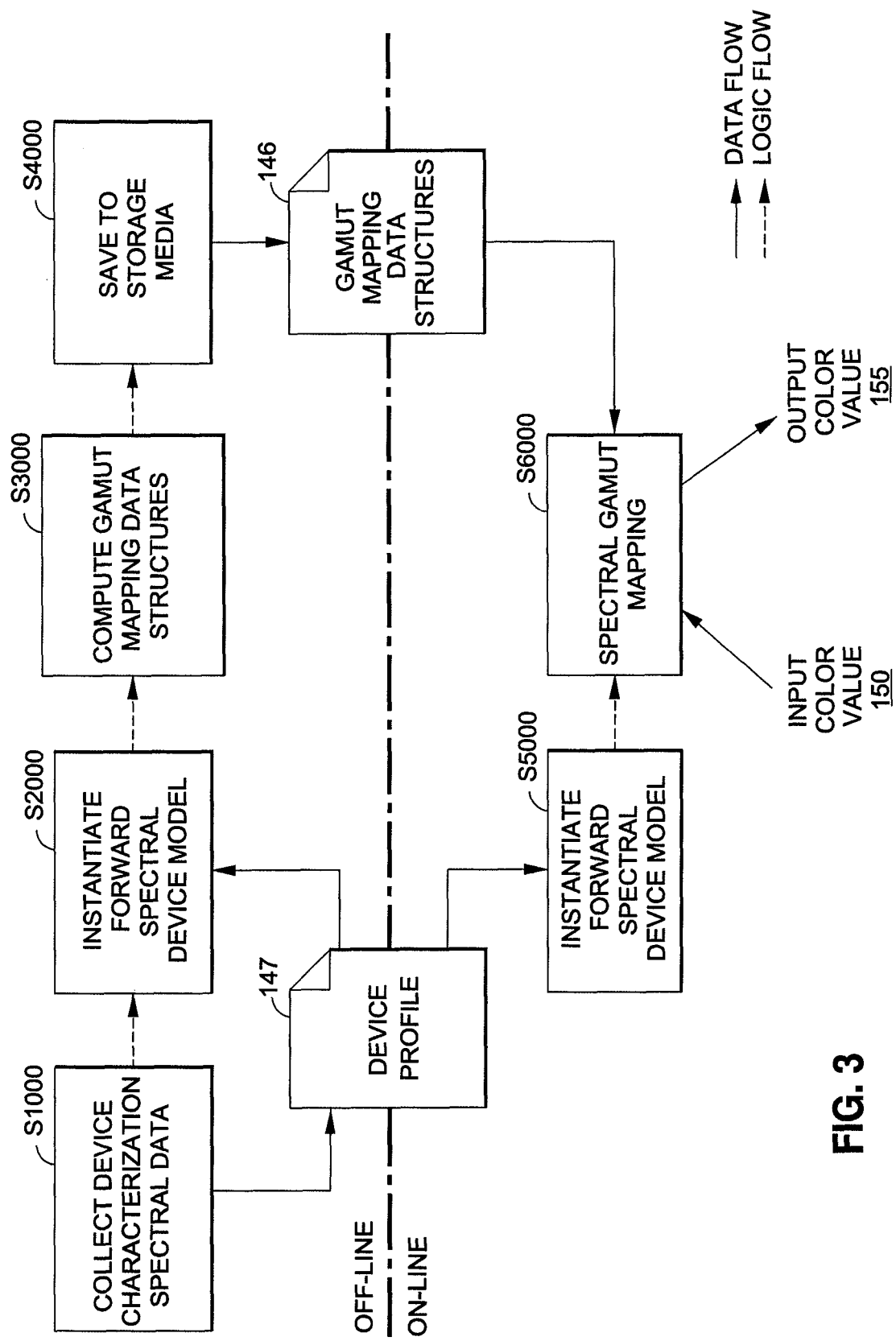
FIG. 3 is a diagram depicting the high level process steps in the off-line and on-line phase according to an example embodiment.

FIG. 3 is an overall representative view of an off-line phase for determining a spectral gamut of a device and an on-line phase for performing spectral gamut mapping according to an example embodiment.

Embodiment of the Off-Line Phase

Briefly from FIG. 3, in an off-line phase typically occurring in a device profiling process, device characterization spectral data is collected in step S1000 and used to create device profile 147. In step S2000, forward spectral device model 140 is instantiated using device profile 147. In addition, gamut mapping data structures are computed in step S3000, and are saved to storage media in step S4000 as gamut mapping data structures 146.

In more detail, in step S1000 of the off-line phase, device characterization spectral data is collected that can include spectral measurements of color samples produced by the output device. This device characterization spectral data is saved in step S1000 as device profile 147, which can be installed on host computer 41 and accessed during the on-line phase.

In step S2000, forward spectral device model 140 is instantiated using device profile 147. A forward spectral device model is a mathematical representation of a physical device based on collected measurements, such as the measurements collected in step S1000, such that it can predict the spectral reflectance of colors that are not present in the collected measurements. In the case of the device being a multi-ink printer, such as printer 90, modeling methods such as the "Cellular Yule-Nielsen Spectral Neugebauer Model" have been successfully used to model a printer based on spectral measurements of 4000-6000 color patches. Techniques based on other physical ink mixing theories such as Kubelka-Munk theory may also yield acceptable forward spectral device models for printers. The forward spectral device model relates device value to spectral reflectance, which is represented as an array of values referred to herein as a spectral reflectance array. By applying the forward spectral device model to device values corresponding to printable ink combinations, a spectral reflectance array corresponding to each device value may be obtained.

In step S3000, gamut mapping data structures are computed. Gamut mapping data structures comprise a data structure called a "constrained subdivision" of the spectral gamut and another data structure for computational efficiency called an "auxiliary computational data structure". Step S3000 is explained below in greater detail with reference to FIG. 4.

Figure 4:
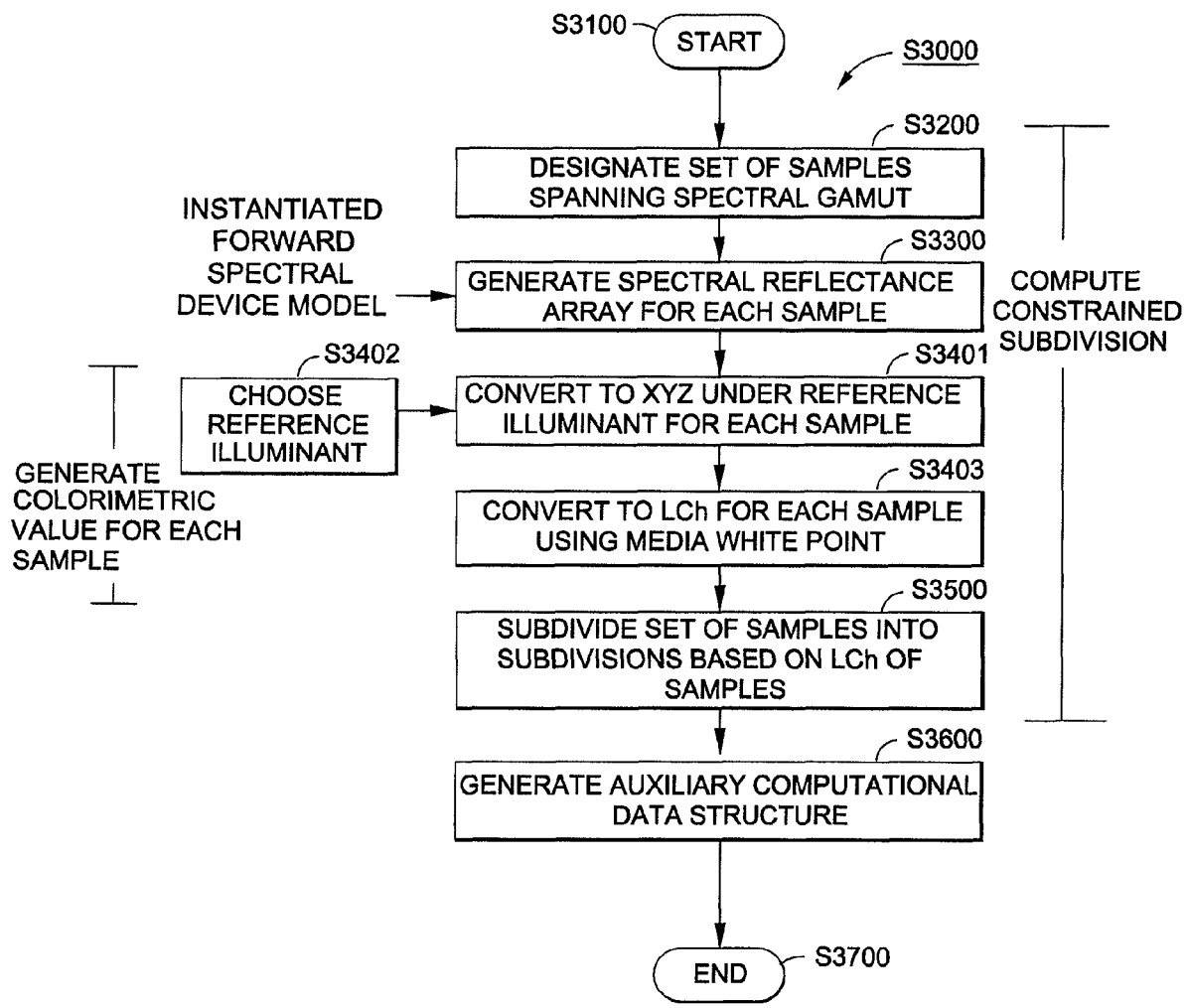
FIG. 4 is a flow diagram depicting process steps of the off-line phase according to an example embodiment.

FIG. 4 is a flow diagram illustrating the process steps included in step S3000 according to an example embodiment.

Briefly, after starting the process at step S3100, a set of samples spanning the spectral gamut of the device is designated in step S3200 by specifying plural device values in a device color space. In step S3300, a spectral reflectance array is generated for each sample using the forward spectral device model instantiated in step S2000 and the device value corresponding to the sample. A colorimetric value for each spectral reflectance array is then generated in steps S3401 to S3403 by transforming the spectral reflectance array corresponding to the sample under a reference illuminant. The colorimetric value is defined in a lightness-chroma-hue (LCh) space and has a lightness in a lightness dimension, a chroma in a chroma dimension and a hue in a hue dimension. In step S3500, the computation of the constrained subdivision is completed by subdividing the set of samples into subdivisions based on the lightness, chroma and hue of the samples such that the number of samples in each subdivision is limited by a predetermined number. In step S3600, the auxiliary computational data structure is computed, and the process ends at step S3700.

In more detail, in step S3200, a large set of samples is designated so as to span the spectral gamut of the device. In this and following examples, the designated set of samples will be denoted by S.

The designation of samples can be accomplished by specifying a large number of device values in the device color space. In general, as many samples as are computationally feasible can be used. However, a specification, such as having all device values allowable for the device, may not be computationally feasible. For example, a six-ink printer addressable in 256 levels per channel would have a total number of ink combinations equal to $256^6 = 281,474,976,710,656$. Unfortunately, this number of samples can be impracticable for computers in terms of speed and storage. Further, this example assumes only six inks, while printers with more than six inks exist. In general, the number of ink combinations grows exponentially with the number of inks. Thus, a procedure other than exhaustive enumeration of all possible device values, and in particular a procedure whose computational complexity is of polynomial growth in the number of inks, may be highly desirable.

For the case of the device being a printer, the number of samples designated in step S3200 can be limited by restricting a maximum number of inks to be used out of a total number of inks available when printing a color. In this regard, it can be assumed that most of the spectral gamut is spanned by samples corresponding to three-or-less-ink combinations. Thus, if there are J inks, and n+1 steps are sampled in each ink channel, then the total number of three-or-less-ink combinations can be calculated as follows:

$$\binom{J}{3} \cdot n^3 + \binom{J}{2} \cdot n^2 + J \cdot n + 1 \quad \text{(Equation 1)}$$

For example, if there are six inks (J=6), and n=51 (i.e., steps of five digital counts, or about 2%), then the total number of samples specified in this manner is 2,692,342, which is computationally feasible.

Figure 5:
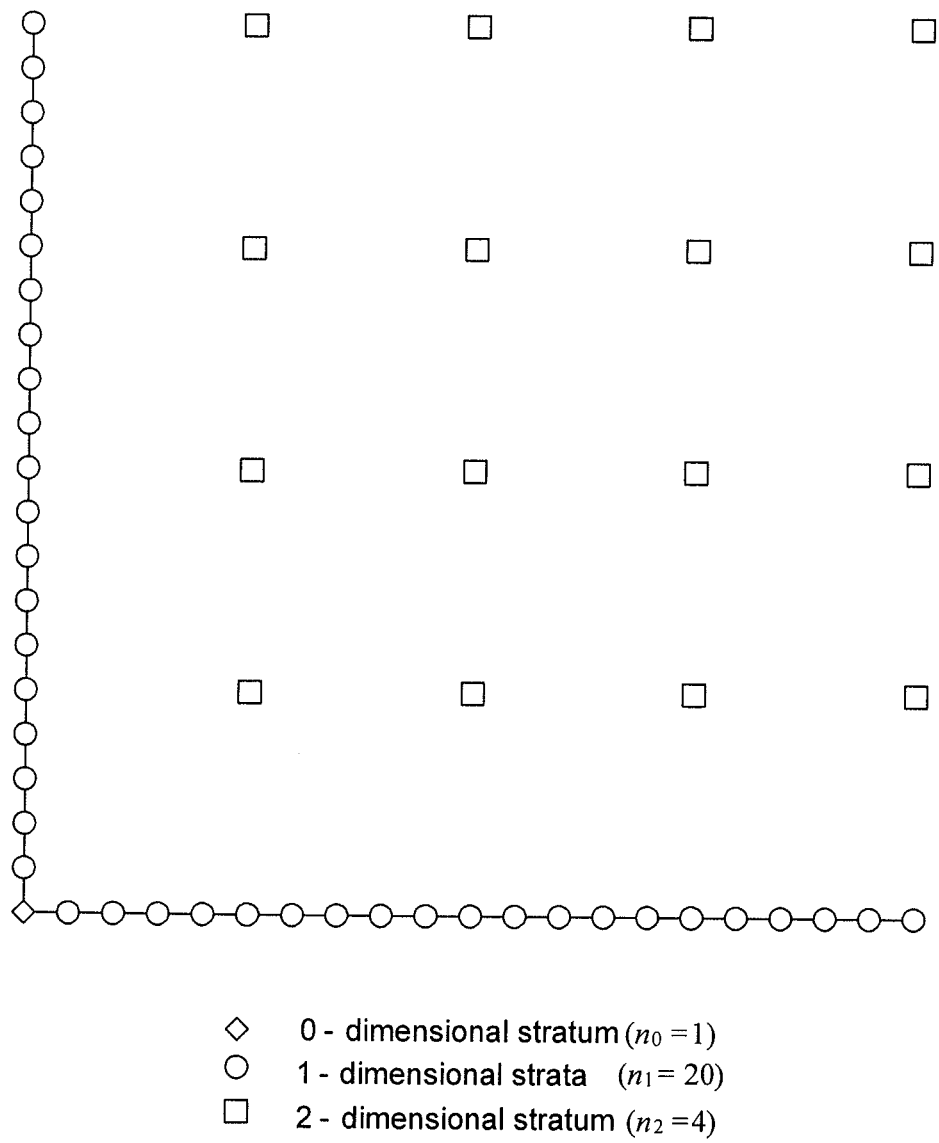
FIG. 5 is a representative view of stratified sampling of a device space for use in designating samples according to an example embodiment.

With reference to FIG. 5, a more general formula, corresponding to a stratified sampling of the device color space, can be used to specify device values. FIG. 5 illustrates a stratified sampling of a hypothetical two-dimensional device space. It can be understood that the concept of stratified sampling can be generalized to device space of arbitrary dimension. Such stratified sampling can generally allow sampling of the device color space at different sampling rates, depending on the dimension of the stratum. A general formula for the stratified sampling can be as follows:

$$\sum_{i=0}^{J} \binom{J}{i} \cdot n_i^i, \quad \text{(Equation 2)}$$

where $n_i+1$ steps are used in sampling all i-dimensional strata. The above-mentioned example corresponds to the case J=6, $n_0=1$, $n_1=n_2=n_3=51$ and $n_4=n_5=n_6=0$. In general, a judicial choice of a stratified sampling can help to sample the important areas of the gamut while reducing the total number of samples to a manageable number. In addition, four or more inks in an ink combination can be allowed, with the sampling rate for those combinations judicially reduced. For example, the values of J=6, $n_0=1$, $n_1=n_2=255$, $n_3=51$, $n_4=17$, $n_5=n_6=0$ can be used to allow exhaustive sampling for two-or-less ink combinations, fine sampling for 3-ink combinations, coarser sampling for 4-ink combinations, while 5-or-more ink combinations are not sampled. This results in the inclusion of four-ink combinations, which contribute significantly to the spectral gamut, but sampled at a reduced sampling rate of 18 steps, making a total "nominal" number of 4,882,741 of samples. The number is called "nominal" because some ink combinations are not allowed due to ink limiting, as explained in the following.

It should be noted that even when only a maximum of three inks at a time is considered, not all designated ink combinations are allowed due to ink limiting. In fact, the actual allowable ink combinations may be significantly lower than the nominal number. For example, after ink limiting is applied to a Canon i9900™ inkjet printer with CMYKRG inks (i.e., six inks), the number of allowable three-ink combinations described above is reduced to 1,285,896 in an example embodiment, and the number of allowable four-ink combinations described above is reduced to 2,317,811 in an example embodiment.

Before further describing the constrained subdivision of the sample set S, an explanation of the subdivision strategy will be given with reference to FIG. 6.

Figure 6:
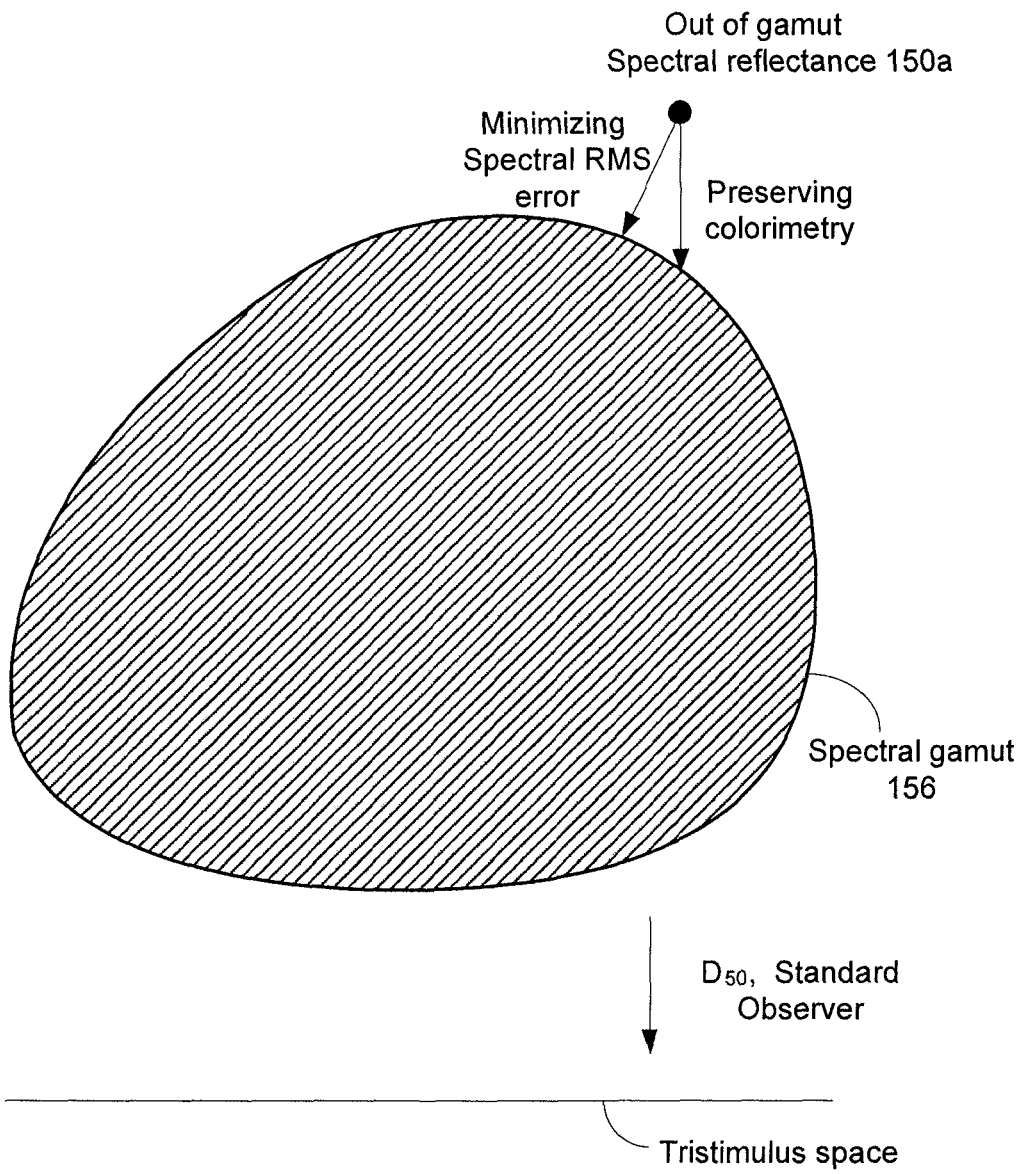
FIG. 6 is a diagram illustrating different spectral gamut mapping strategies.

FIG. 6 is a representative view of two different approaches to mapping out-of-gamut spectral reflectance 150a onto spectral gamut 156 of a device, such as printer 90. The first approach is a minimizing spectral root-mean-square (RMS) error approach. In this approach, the spectral RMS error can be proportional to the Euclidean distance in the spectral reflectance space. Using this first approach, it should be noted that the spectral RMS error does not necessarily correlate to visual error. In other words, a small spectral RMS error may correspond to a large delta-E, which is typically used to quantify the perceived error.

In a more sophisticated second approach, the spectral RMS error can be minimized subject to the constraint to preserve colorimetry corresponding to out-of-gamut spectral reflectance 150a under a certain reference illuminant, such as D50. Using this second approach, minimization can be seen to be constrained along fixed colorimetry.

Building on the idea of spectral gamut mapping constrained to fixed colorimetry, it is possible to subdivide samples that span spectral gamut 156 based on their colorimetry under a reference illuminant. Samples are classified into various subdivisions each of which has prescribed bounds in the colorimetric space and corresponds to small regions in the colorimetric space.

Returning to FIG. 4, in step S3300, a spectral reflectance array for each sample is generated by processing the device values corresponding to each sample through the forward spectral device model instantiated in step S2000 of FIG. 3.

In steps S3401 to S3403, a colorimetric LCh value is generated for each sample. In step S3401, each spectral reflectance array for each sample is converted to XYZ values under the reference illuminant chosen in step S3402. The reference illuminant can be chosen, for example, to be D50 or D65. Mathematically, an illuminant can be described by its spectral power distribution (SPD), written as I($\lambda$), where $\lambda$ represents the wavelength. In practice, an SPD can be represented as an array of intensities sampled at different wavelengths similar to spectral reflectance. However, since an SPD is generally non-smooth (e.g., has spikes), the sampling is typically done at smaller intervals (e.g., every 1 nm). For example, an SPD can be represented as a 301-dimensional vector, corresponding to sampling from 400 nm to 700 nm at 1 nm intervals. If s($\lambda$) is the spectral reflectance in question, then equations for conversion to XYZ value can be as follows:

$$X = \int_{400}^{700} s(\lambda) I(\lambda) \bar{x}(\lambda)\, d\lambda \quad \text{(Equation 3)}$$

$$Y = \int_{400}^{700} s(\lambda) I(\lambda) \bar{y}(\lambda)\, d\lambda \quad \text{(Equation 4)}$$

$$Z = \int_{400}^{700} s(\lambda) I(\lambda) \bar{z}(\lambda)\, d\lambda \quad \text{(Equation 5)}$$

The integration can be done by discrete summation at 1 nm intervals. The illuminant and the CIE "standard observer" functions $\bar{x}$, $\bar{y}$ and $\bar{z}$ are typically provided at 1 nm intervals, while the spectral reflectance s($\lambda$) can be re-sampled at 1 nm intervals (if it is originally sampled at 10 nm intervals), using typical interpolation techniques (e.g., linear interpolation).

In step S3403, the XYZ values are converted to LCh using the media white point. The media white point is the XYZ value of the color of the media. In the case of printer 90, this corresponds to no colorants and is the XYZ value of the paper white. Using the media white point is typically preferred to using the XYZ value of the reference illuminant in this conversion, because the resulting LCh gamut will typically have its "device neutral" axis aligned with a lightness axis. In particular, the media white point will typically correspond to an LCh of (100, 0, 0). Most conveniently, the media white point can be arranged to correspond to the first sample of the sample set S. If the media white point is represented as $X_0, Y_0, Z_0$, then Lab values, expressed in CIELab space as L*, a* and b*, can be calculated as follows:

$$L^* = 116 f(Y/Y_0) - 16 \quad \text{(Equation 6)}$$

$$a^* = 500[f(X/X_0) - f(Y/Y_0)] \quad \text{(Equation 7)}$$

$$b^* = 200[f(Y/Y_0) - f(Z/Z_0)] \quad \text{(Equation 8)}$$

$$\text{where } f(x) = \begin{cases} x^{1/3} & \text{if } x > (6/29)^3 \\ 1/3(29/6)^2 x + 4/29 & \text{if } x \leq (6/29)^3 \end{cases} \quad \text{(Equation 9)}$$

Further, LCh values, corresponding to the cylindrical coordinates for the Lab values, can be calculated as follows:

$$C_{ab}^* = \sqrt{a^{*2} + b^{*2}} \quad \text{(Equation 10)}$$

$$h_{ab} = \arctan(b^*/a^*) \quad \text{(Equation 11)}$$

with L* remaining the same as calculated above in Equation 6.

For convenience, the set of LCh values for the samples in S will be denoted by $\hat{S}$.

Following step S3403, the set of samples are subdivided in step S3500 into subdivisions based on the LCh values of the samples. In subdividing the samples, the general strategy is to treat the following two cases separately: the near-neutral samples (the case of the neutral spine), and samples falling on a hue angle (the case of a hue leaf). In this regard, it should be noted that samples with small chroma may have a hue angle that is noisy. Thus, it is desirable to treat them as near neutral instead of classifying them by their hue angles. The process of subdividing samples within the neutral spine will be described in more detail in reference to FIG. 7, and the process of subdividing samples within the hue leaves will be described in more detail in reference to FIGS. 9 and 11.

Figure 7:
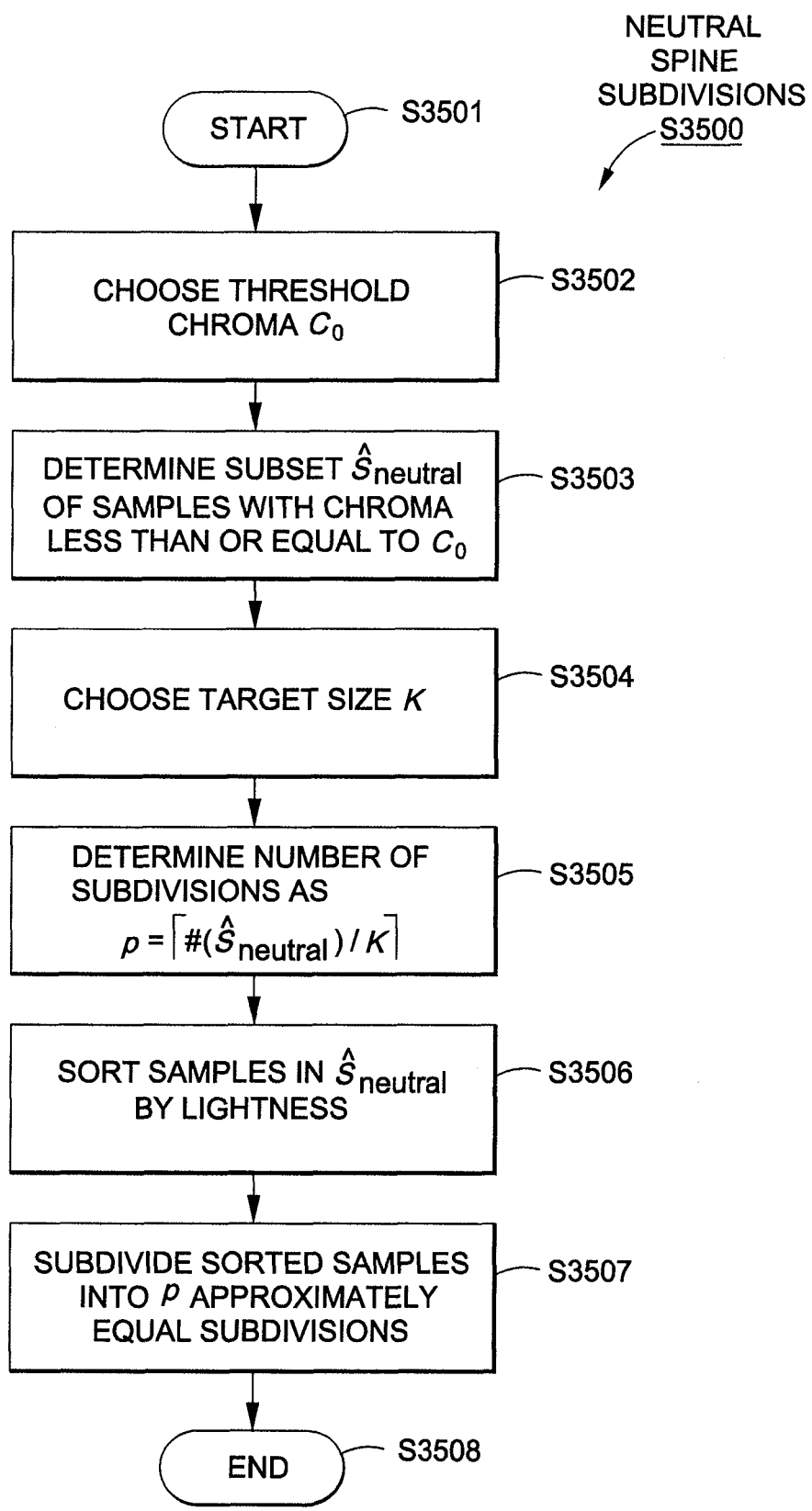
FIG. 7 is a flow diagram depicting the steps in the neutral spine subdivision according to an example embodiment.

FIG. 7 is a flow diagram illustrating the subdivision of samples within the neutral spine as described in step S3500 of FIG. 4. Briefly, a threshold chroma $C_0$ is chosen in step S3502. A subset of samples with a chroma less than or equal to $C_0$ is determined in step S3503. In step S3504, a target size K for the number of samples in each subdivision of the neutral spine is chosen. In particular, the number of samples in each subdivision of the neutral spine is limited by the predetermined number K. The number of subdivisions is determined in step S3505. The samples in the neutral spine are then sorted by lightness in step S3506 and the samples are then subdivided in step S3507.

In more detail, following step S3501, a threshold chroma $C_0$, such as $C_0=3$, is chosen as an upper bound for the chroma of samples in the neutral spine.

In step S3503, a subset $\hat{S}_{neutral}$ of $\hat{S}$, corresponding to samples having a chroma less than or equal to $C_0$ can be determined as follows:

$$\hat{S}_{neutral} = \{s \in \hat{S} | C_{ab}^*(s) \leq C_0\} \quad \text{(Equation 12)}$$

The notation $C_{ab}^*(s)$ denotes the chroma of the sample s in D50 LCh space. It is noted that as an implementation optimization, when referring to a sample s in $\hat{S}$, it is typical to refer to its index into $\hat{S}$. In an example implementation, specification of which sample is in which subdivision can be stored in storage space by storing the indices of the samples belonging to each subdivision, instead of storing the content of the samples. This can ordinarily save storage space as storing the indices typically requires less storage space than storing the content of the sample (LCh value in this case).

In step S3504, a target size for the number of samples in each subdivision of the neutral spine is chosen as K. $\hat{S}_{neutral}$ is subdivided such that the number of samples in each subdivision is approximately equal to K to ensure each subdivision is populated sufficiently. An example of a choice for K is K=300.

In step S3505, the number of subdivisions p is determined using K and the total number of samples in $\hat{S}_{neutral}$. For example, if the total number of samples in $\hat{S}_{neutral}$ is m, then the number of subdivisions for the neutral spine is p=⌈m/K⌉, where ⌈x⌉ is the ceiling operator that returns the smallest integer greater than or equal to the given number x.

Because the neutral spine is one-dimensional in lightness only, each subdivision can be specified by an upper bound and a lower bound in lightness.

In step S3506, the samples in $\hat{S}_{neutral}$ are sorted by lightness as a preliminary step in determining the upper and lower bounds of the subdivisions.

In step S3507, the upper and lower bounds of the subdivisions are obtained by subdividing the sorted samples in $\hat{S}_{neutral}$ into p subdivisions. In one example of subdividing the sorted samples, the upper and lower bounds, described in terms of the ordinal numbers of the sorted samples, are determined by:

$$1, \left[\frac{m-1}{p}\right]+1, \left[\frac{2(m-1)}{p}\right]+ \\ 1, \left[\frac{3(m-1)}{p}\right]+1, \ldots, \left[\frac{(p-1)(m-1)}{p}\right]+1, m \quad \text{(Equation 13)}$$

where [x] denotes a rounding operator that returns the closest integer to x. Furthermore, the samples in the p subdivisions can be described in terms of the ordinal numbers of the sorted samples, as follows:

$$\begin{aligned}
&\text{1st subdivision } 1, 2, \ldots, \left[\frac{m-1}{p}\right] \\
&\text{2nd subdivision } \left[\frac{m-1}{p}\right]+1, \left[\frac{m-1}{p}\right]+ \\
&\qquad\qquad 2, \ldots, \left[\frac{2(m-1)}{p}\right] \\
&\text{3rd subdivision } \left[\frac{2(m-1)}{p}\right]+ \\
&\qquad 1, \left[\frac{2(m-1)}{p}\right]+2, \ldots, \left[\frac{3(m-1)}{p}\right] \\
&\vdots \\
&(p-1)\text{st subdivision } \left[\frac{(p-2)(m-1)}{p}\right]+1, \\
&\qquad \left[\frac{(p-2)(m-1)}{p}\right]+2, \ldots, \left[\frac{(p-1)(m-1)}{p}\right] \\
&p\text{th subdivision } \left[\frac{(p-1)(m-1)}{p}\right]+ \\
&\qquad 1, \left[\frac{(p-1)(m-1)}{p}\right]+2, \ldots, m
\end{aligned} \quad \text{(Equation 14)}$$

The specification of the subdivision of the neutral spine is determined by recording the lightness bounds for each subdivision above, together with the indices of the samples belonging to each subdivision. It is noted that the indices to be recorded are indices to the sample set $\hat{S}$, or equivalently S, not the ordinal numbers in the sorted order.

After subdividing the sorted samples, the process of FIG. 7 then ends at step S3508.

Figure 8:
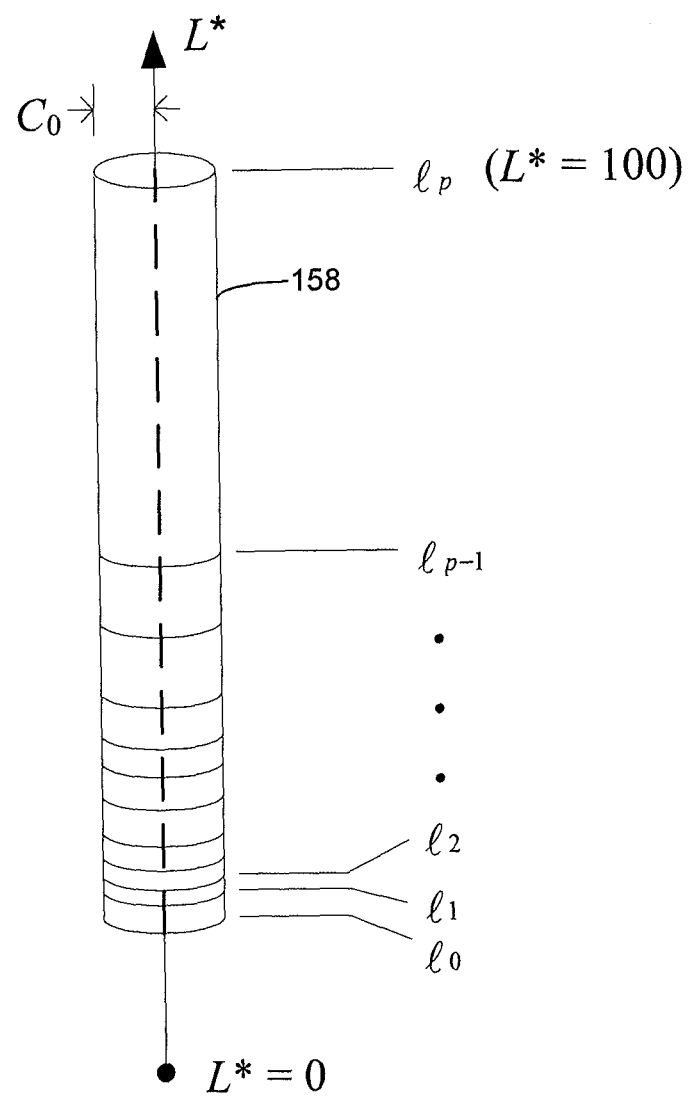
FIG. 8 is a diagram illustrating the neutral spine subdivision according to an example embodiment.

FIG. 8 is a representative view of subdivided neutral spine 158 resulting from the process of FIG. 7. In this example, each subdivision contains approximately K samples. As can be seen in FIG. 8, a set of ascending values in L*, $l_0 < l_1 < \ldots < l_p = 100$ are obtained, which correspond to the upper and lower bounds of each subdivision of neutral spine 158. While $l_p$ is generally equal to 100 because the choice of the white point for the LCh space, $l_0$ is generally not zero, but rather corresponds to the black point of the device. In a different embodiment, where a different white point is used for the LCh space, a different value for $l_p$ other than 100 is possible.

The upper and lower bounds for each subdivision, together with the indices of the samples belonging to each subdivision, are saved to storage media in step S4000 of FIG. 3 to form a neutral spine part of the constrained subdivision, which in turn constitutes a part of gamut mapping data structures 146.

As noted above, in subdividing the set of samples, the near-neutral samples (i.e., the neutral spine) and the samples falling on a hue angle (i.e., a hue leaf) can be treated separately. In this regard, FIGS. 9 to 12 further describe subdividing the set of samples in hue leaves according to an example embodiment.

Figure 9:
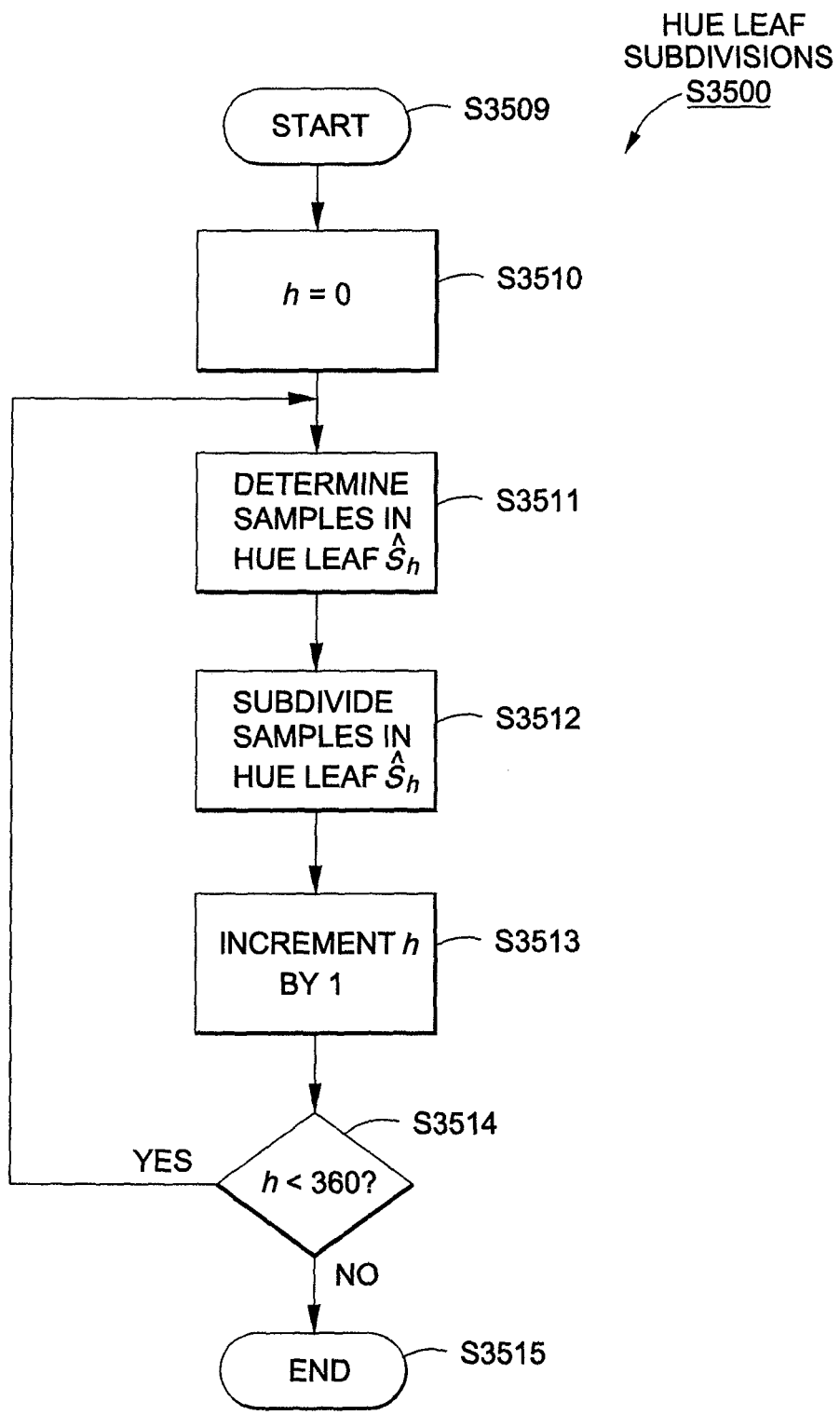
FIG. 9 is a flow diagram depicting the high level process steps of subdivision of hue leaves according to an example embodiment.
Figure 10:
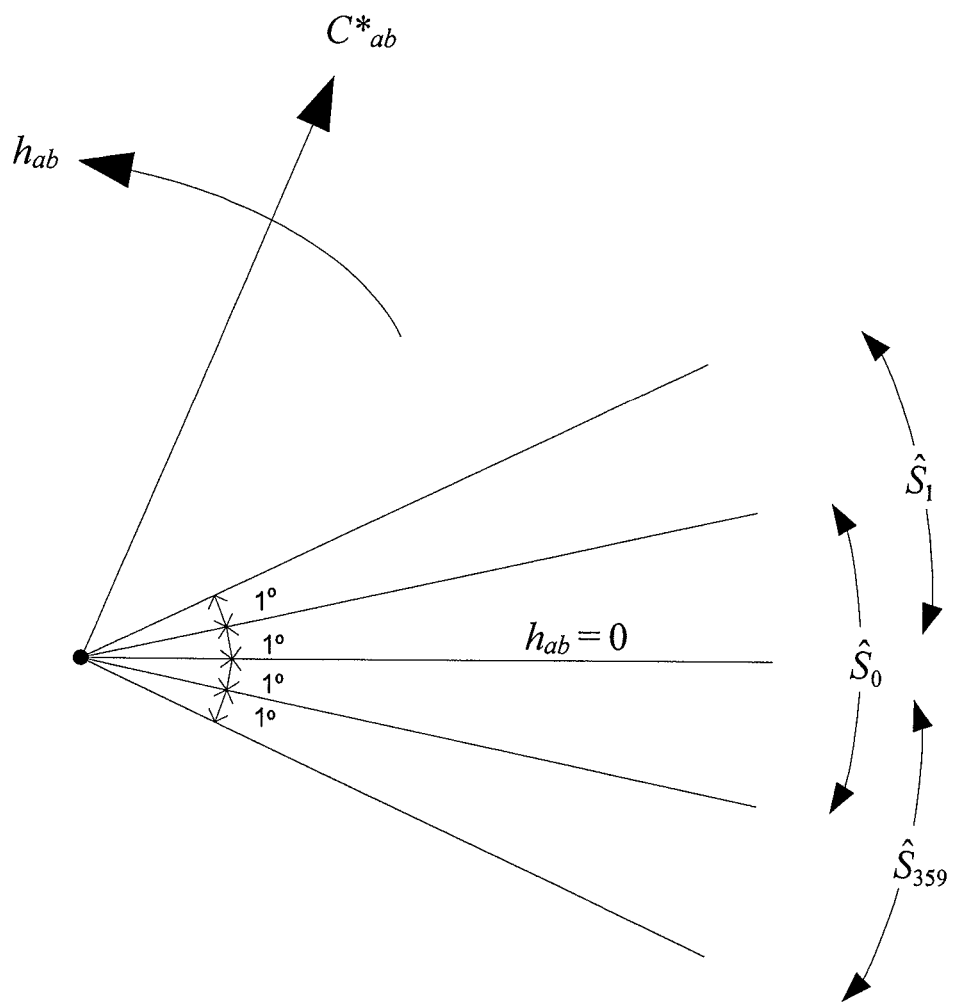
FIG. 10 is a diagram illustrating the span of hue angle for each hue leaf according to an example embodiment.

In the example of FIG. 9, 360 hue leaves are defined. Of course, a different number of hue leaves can be used. Briefly, following step S3509, a running integer h representing the hue is initialized to 0 in step S3510. The samples within a hue leaf corresponding to the hue integer h are determined in step S3511 and then the samples in this hue leaf are subdivided in step S3512. The hue integer h is then incremented by one in step S3513 and it is determined in step S3514 whether the hue integer h is less than 360. If the hue integer h is less than 360, the process returns to step S3511 to determine and subdivide samples in the next hue leaf. If the hue integer h is not less than 360, the process ends at step S3515.

In more detail, in step S3510, the initialization of the hue integer h to 0 corresponds to selecting a first hue leaf of zero hue angle.

In step S3511, the samples within the hue leaf corresponding to the integer h are determined. As shown in the example diagram of FIG. 10, for hue integers h=0, 1, 2, . . . , 359, a subset $\hat{S}_h$ of $\hat{S}$ is determined, and is defined as follows:

$$\hat{S}_h = \{s \in \hat{S} \mid |h_{ab}(s) - h| \le 1\} \quad \text{(Equation 15)}$$

Figure 15:
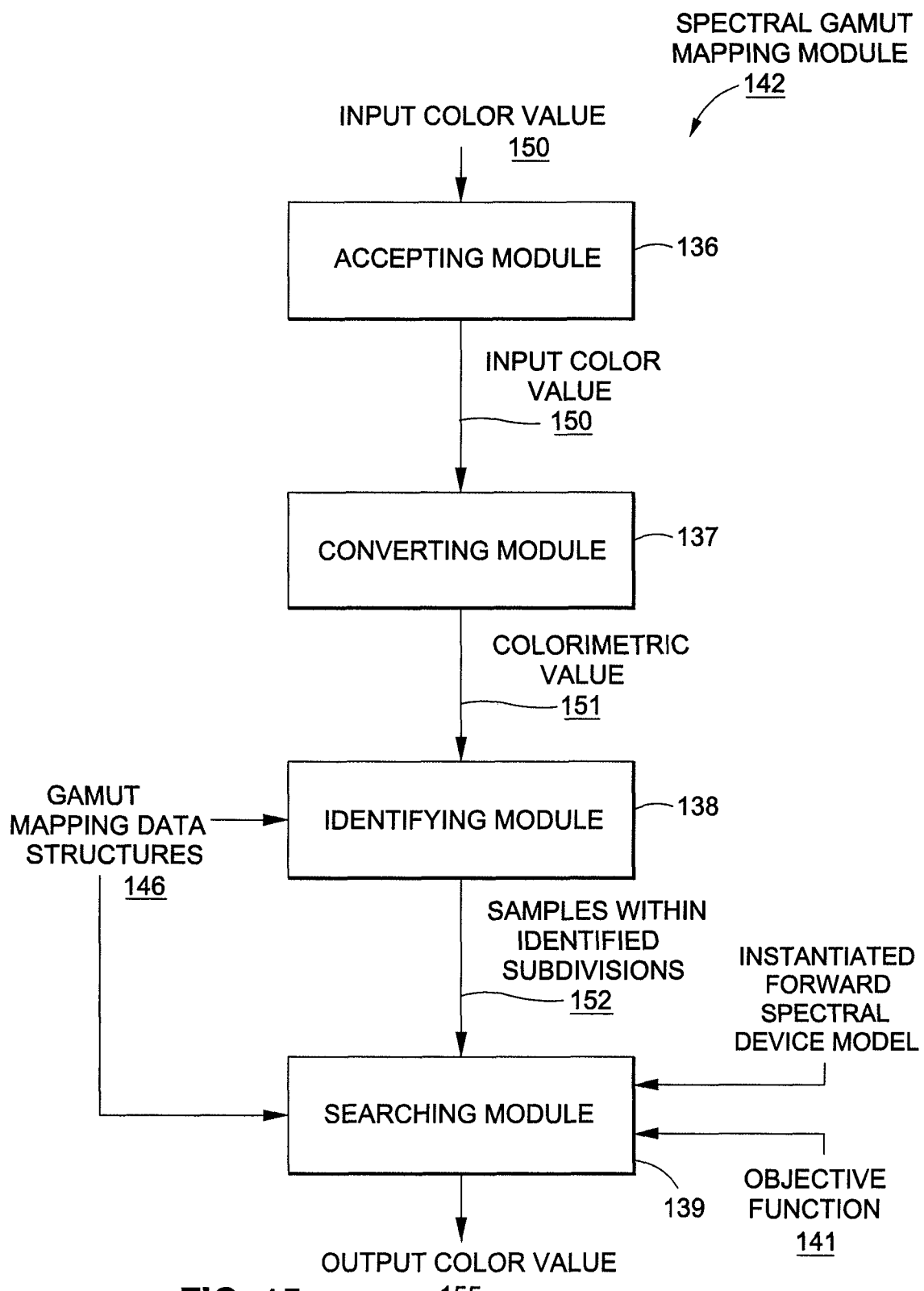
FIG. 15 is a flow diagram depicting process steps of the on-line phase according to an example embodiment.

In other words, samples with a hue angle within 1 degree from hue integer h are included in a given hue leaf, as illustrated in FIG. 15. In Equation 15, the notation $h_{ab}(s)$ is used to denote the hue angle of a sample s in LCh space under the reference illuminant. The overlap between the hue leaves is deliberate and can smooth out the variation of the sample distribution as the hue is varied.

In step S3512, the samples in the hue leaf corresponding to the hue integer h are subdivided based on lightness and chroma.

In step S3513, the hue integer h is incremented so as to select the next hue leaf and in step S3514, it is determined whether the current hue integer h is less than 360. In other words, it is determined whether all hue leaves have been considered. If the current hue integer h is less than 360, the process returns to step S3511 to determine and subdivide samples in the next hue leaf. If hue integer h is not less than 360, the process ends at step S3515.

Figure 11:
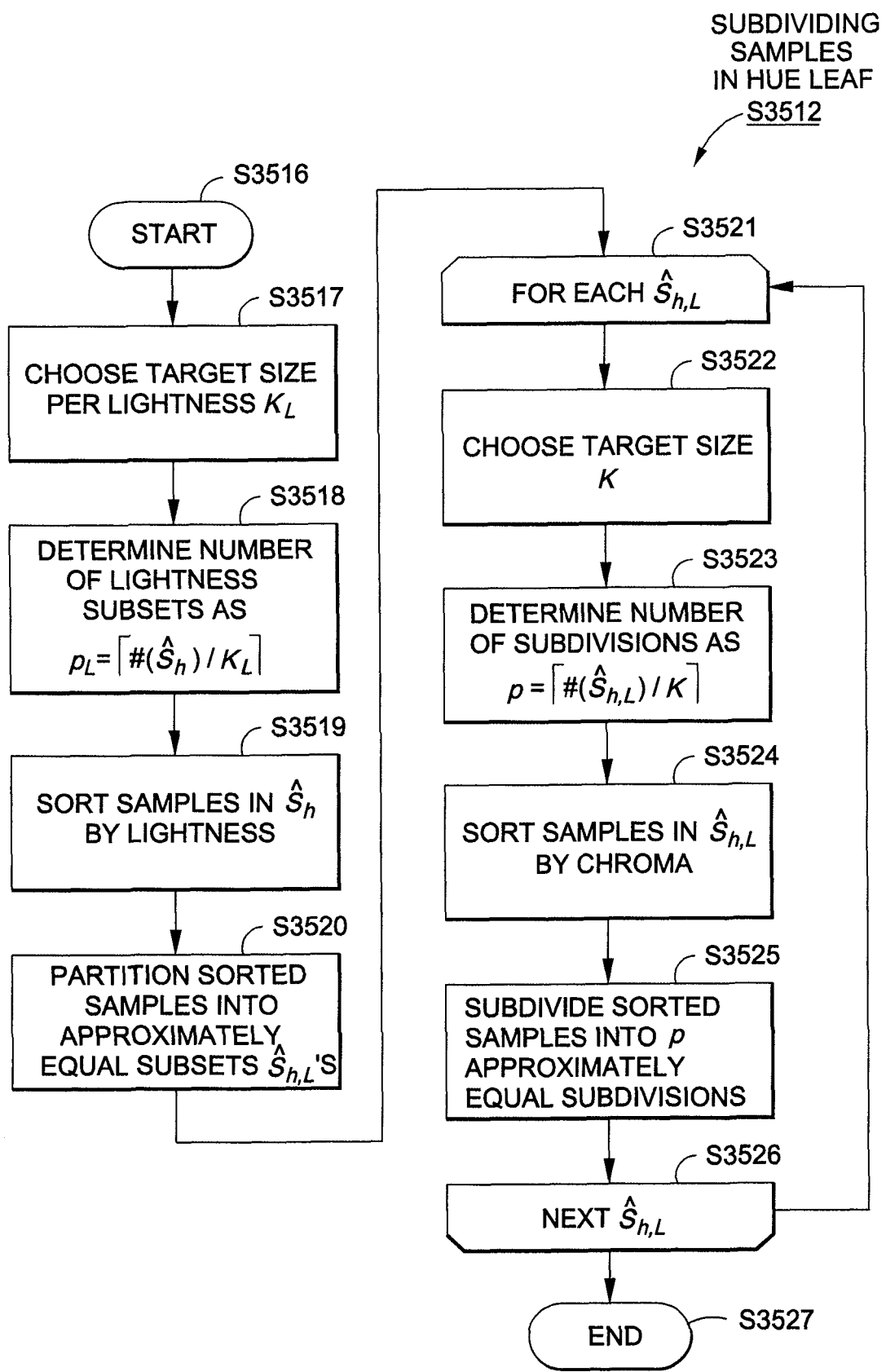
FIG. 11 is a flow diagram depicting the process steps for subdividing a hue leaf according to an example embodiment.

FIG. 11 is a flow diagram further illustrating the subdividing of samples in a hue leaf as performed in step S3512 of FIG. 9.

Briefly, following step S3516, for samples within a given hue leaf, $\hat{S}_h$, a target number of samples per lightness subset is chosen in step S3517. In step S3518, a total number of lightness subsets is determined for the given hue leaf. Samples in $\hat{S}_h$ are then sorted by lightness in step S3519 and then partitioned into approximately equal subsets $\hat{S}_{h,L}$'s in step S3520. Next, in the loop defined by S3521 and S3526, for each $\hat{S}_{h,L}$, a target number of samples per subdivision within each lightness subset is chosen in step S3522. In particular, the number of samples in each subdivision is limited by a predetermined number. In step S3523, the number of subdivisions p is determined and the samples in $\hat{S}_{h,L}$ are sorted by chroma in step S3524. The chroma sorted samples are subdivided into p approximately equal subdivisions in step S3525. The process ends at step S3527 after each $\hat{S}_{h,L}$ has been processed.

In more detail, in step S3517, for samples within a given a hue leaf, $\hat{S}_h$, a target number of samples per lightness subset is chosen as $K_L$ in step S3517. For example, $K_L$ may be chosen as 500 samples per lightness subset.

In step S3518, a total number of lightness subsets for the given hue leaf is determined as $p_L=\lceil\#(\hat{S}_h)/K_L\rceil$. In other words, the total number of lightness subsets $p_L$ in a hue leaf is determined by applying the ceiling operator to the total number of samples in the hue leaf divided by $K_L$.

Figure 12A:
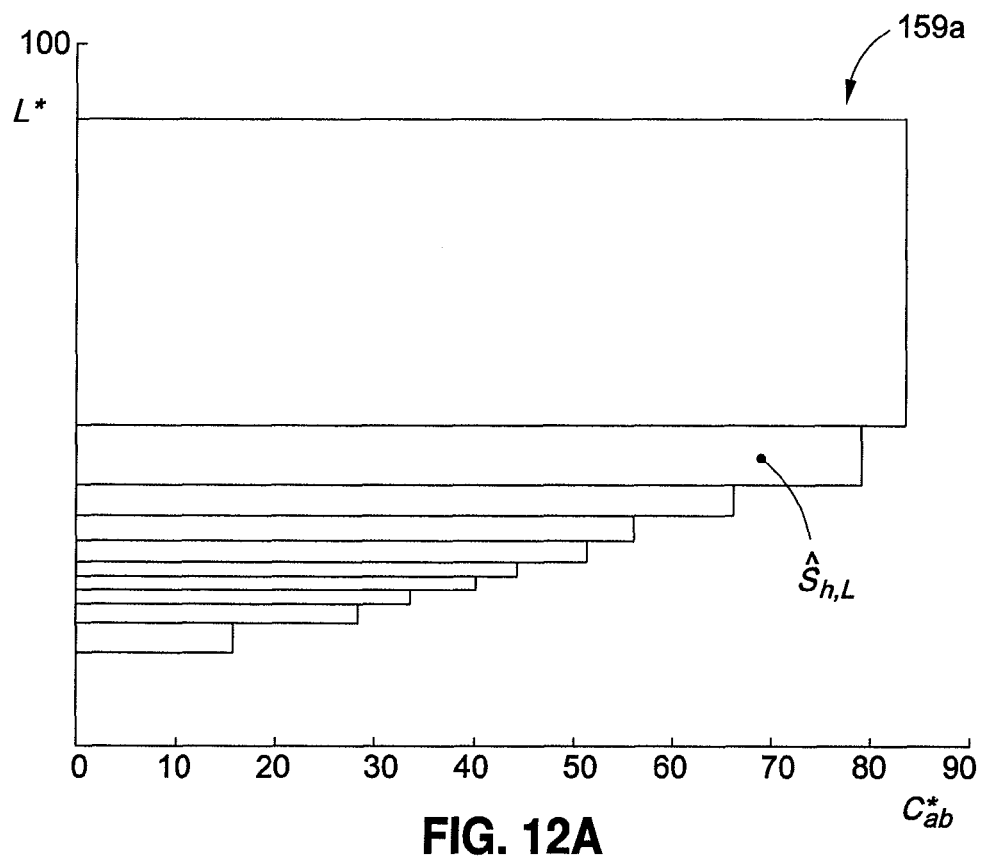
FIGS. 12A and 12B are diagrams illustrating the subdivision of hue leaves according to an example embodiment.

In step S3519, the samples in $\hat{S}_h$ are sorted by lightness in ascending order in lightness L*. In step S3520, the sorted samples in $\hat{S}_h$ are then partitioned into $p_L$ approximately equal lightness subsets $\hat{S}_{h,L}$'s in a similar manner as described for the subdivision of the neutral spine. Each lightness subset is bracketed by upper and lower bounds in lightness. In other words, the samples of $\hat{S}_h$ are partitioned into subsets of approximately equal numbers of samples of a target size (e.g., 500) based on the lightness of the samples within $\hat{S}^h$. FIG. 12A illustrates the subdivision at this point with hue leaf 159a partitioned based on the lightness of samples $\hat{S}_h$ to form ten lightness subsets such as $\hat{S}_{h,L}$.

Referring again to FIG. 11, in the loop defined by S3521 and S3526, for each $\hat{S}_{h,L}$, a target number of samples per subdivision within each lightness subset is chosen as K in step S3522. For example, K may be chosen as 100 samples per subdivision.

In step S3523, the total number of subdivisions for a given lightness subset $\hat{S}_{h,L}$ is determined as $p=\lceil\#(\hat{S}_{h,L})/K\rceil$ in a manner similar to determining the number of lightness subsets described above in reference to step S3518.

In step S3524, the samples in $\hat{S}_{h,L}$ are sorted by ascending chroma. In step S3525, the chroma sorted samples within $\hat{S}_{h,L}$ are subdivided into p subdivisions based on their chroma. Each subdivision is bracketed by upper and lower bounds in lightness L* and by upper and lower bounds in chroma $C_{ab}*$.

Figure 12B:
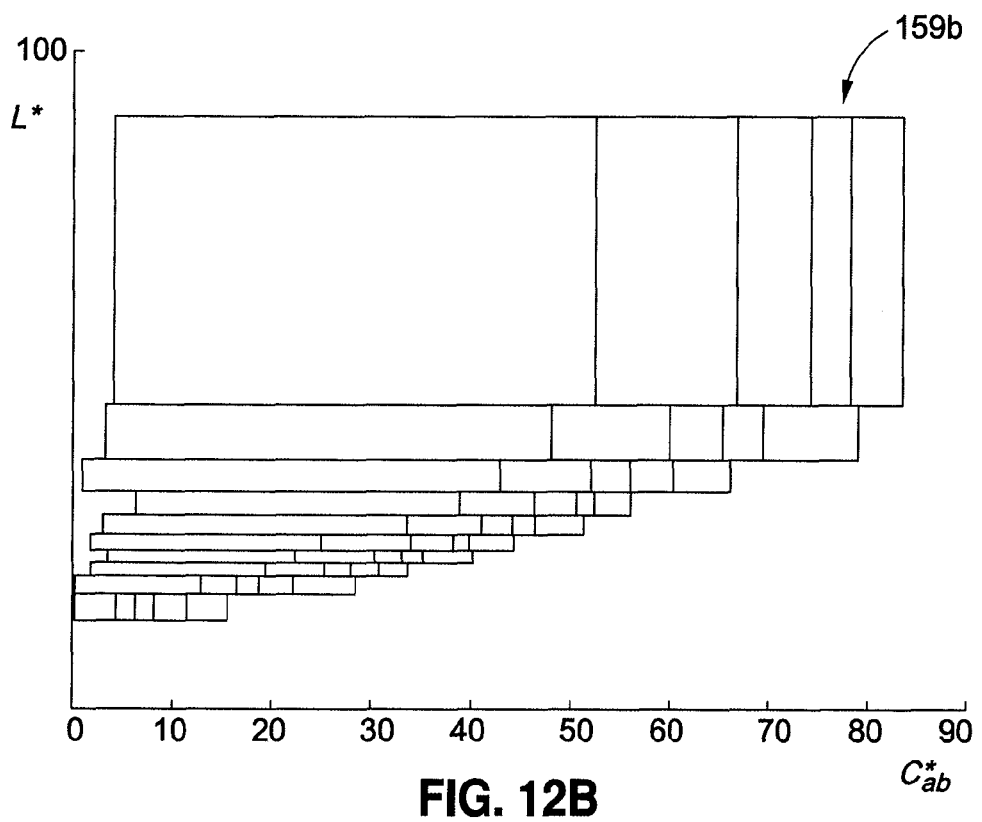

In the above example process, after step S3525 is performed on each of the lightness subsets $\hat{S}_{h,L}$, the samples in $\hat{S}_h$ have been subdivided into subdivisions of approximately 100 samples, with five subdivisions in a given lightness range. This is illustrated in FIG. 12B, which shows subdivided hue leaf 159b.

Figure 13:
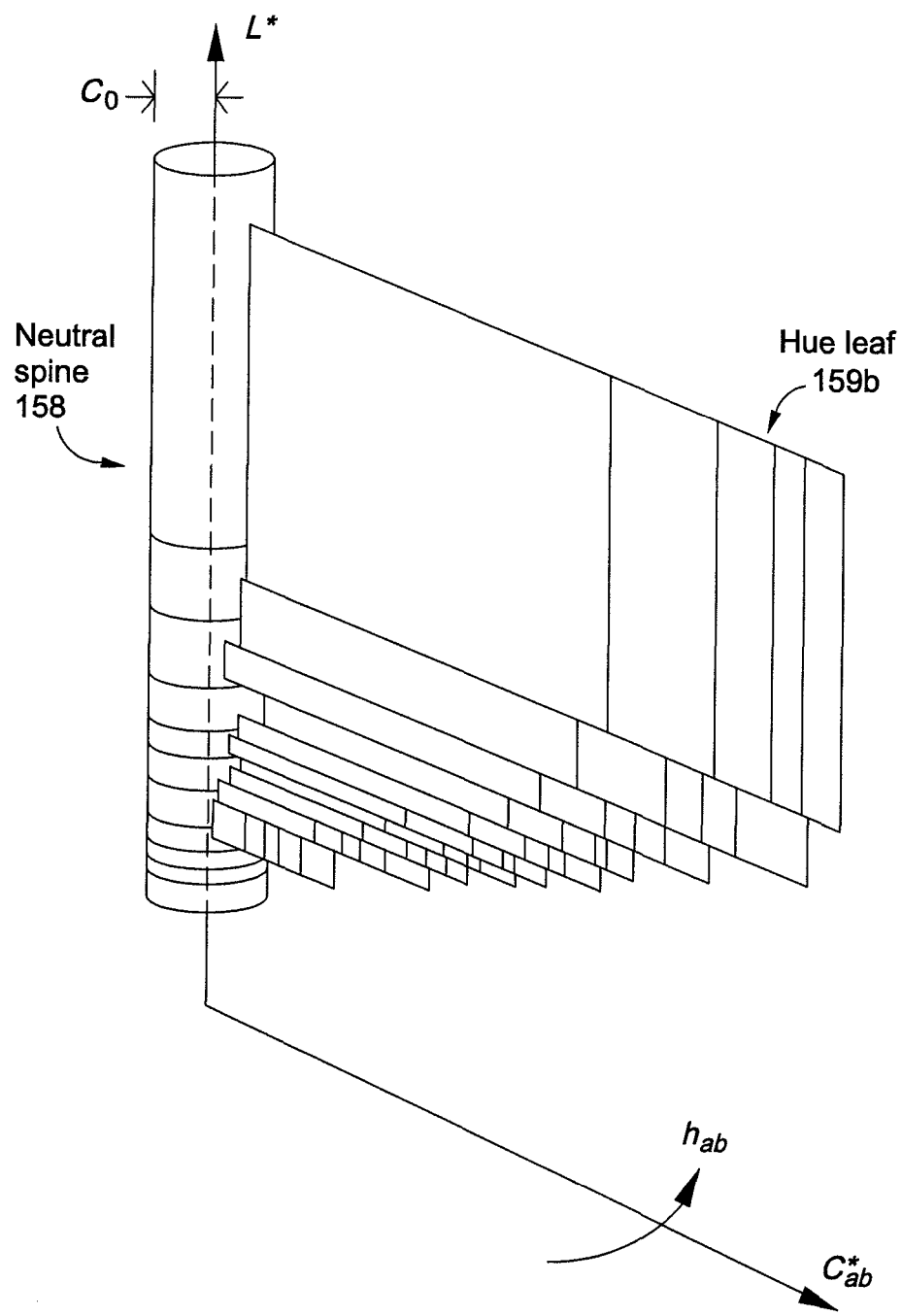
FIG. 13 is a representative view of the relationship between the neutral spine and the hue leaves according to an example embodiment.

Furthermore, FIG. 13 depicts the relationship between neutral spine 158 and hue leaf 159b according to the example embodiment described above.

Analogous to the neutral spine subdivisions, each hue leaf subdivision is saved to storage media in step S4000 of FIG. 3 which collectively form a hue leaves part of the constrained subdivision, which in turn constitutes a part of gamut mapping data structures 146. More specifically, for each hue leaf, the upper and lower bounds for each lightness subset, the upper and lower bounds for each subdivision within each lightness subset, together with the indices of samples belonging to each subdivision, are duly recorded.

This completes the description of step S3500 in FIG. 4, which is the last step of the computation of the constrained subdivision.

In reference to FIG. 4, step S3600 for generating the auxiliary computational data structure will now be explained. The auxiliary computational data structure is obtained by generating one or more colorimetric attributes for each sample in the set of samples S for calculating an objective function, wherein a colorimetric attribute includes a colorimetric value under an illuminant, a color inconstancy index from an illuminant to a reference illuminant, or a combination of multiple such colorimetric attributes. More specifically, as will be explained in later sections regarding the on-line phase, objective function 141 is used to search for a sample from the set of samples S that matches acceptably to an input color value. In order to compute objective function 141 for each sample efficiently, the auxiliary computational data structure is generated during the off-line phase and contains pre-computed quantities for use in the computation of objective function 141 during the on-line phase.

In more detail, the auxiliary computational data structure can be constructed to support multiple objective functions for the purpose of different applications or gamut mapping intent. Each application or gamut mapping intent corresponds to an embodiment of the objective function, which is now explained.

First Embodiment of the Objective Function

While a choice for objective function 141 might be the spectral root-mean-square (RMS) error, the RMS error does not correlate with visual error, as noted in reference to FIG. 6 above. Thus, a better choice for objective function 141 is an objective function that is based on delta-E. An embodiment of the objective function is the following:

$$\mathrm{Obj1}(r,s)=\max_{I\in\{D50,D65,A,F2,F7,F11\}}\Delta E(r,s,I) \quad \text{(Equation 16)}$$

Here, the notation $\Delta E(r,s,I)$ denotes the delta-E under illuminant I between the spectral reflectance array r corresponding to the input color value and the spectral reflectance array s corresponding to a sample in S. The delta-E equation chosen can be $\Delta E_{ab}$, $\Delta E_{94}$ or other delta-E equations.

The set of illuminants used can depend on the application. Illuminants D50, D65, A, F2, F7 and F11 are chosen above to represent a balanced set of illuminants. Illuminant D50 is a daylight illuminant, illuminant A is an incandescent illuminant, and illuminants F2, F7 and F11 are fluorescent illuminants with different characteristics in their spectral power distribution.

Using the objective function of Equation 16, the sample that minimizes the objective function would ordinarily have the smallest visual error under the set of chosen illuminants.

The value of $\Delta E(r,s,I)$ can be computed with the following procedure. First, XYZ values of the two spectral reflectance arrays under illuminant I can be calculated using Equations 3 to 5 provided above. The XYZ values for the two spectral reflectance arrays can be converted into Lab values using Equations 6 to 9, with $X_0$, $Y_0$ and $Z_0$ being the XYZ value for the white point of illuminant I. If the delta-E equation used is $\Delta E_{ab}$, the following equation can be used to calculate $\Delta E_{ab}$:

$$\Delta E_{ab}(r,s,I)=\sqrt{(L-L')^2+(a-a')^2+(b-b')^2} \quad \text{(Equation 17)}$$

where L, a, and b denote the Lab value for the spectral reflectance array r, and L', a', and b' denote the Lab value for the spectral reflectance array s. It can be appreciated that $\Delta E_{ab}(r,s,I)$ is a function of the two Lab values under illuminant I.

If the delta-E equation used is $\Delta E_{94}$, the following set of equations can be used to calculate $\Delta E_{94}$:

$$\Delta L=L-L' \quad \text{(Equation 18)}$$

$$C=\sqrt{a^2+b^2} \quad \text{(Equation 19)}$$

$$C'=\sqrt{a'^2+b'^2} \quad \text{(Equation 20)}$$

$$\Delta C=C-C' \quad \text{(Equation 21)}$$

$$\Delta H=\sqrt{(a-a')^2+(b-b')^2-(\Delta C)^2} \quad \text{(Equation 22)}$$

$$\Delta E_{94}(r,s,I)=\sqrt{(\Delta L/k_L S_L)^2+(\Delta C/k_C S_C)^2+(\Delta H/k_H S_H)^2} \quad \text{(Equation 23)}$$

where $k_L=k_C=k_H=S_L=1$, $S_C=1+0.045C$, and $S_H=1+0.015C$. It can be appreciated that $\Delta E_{94}(r,s,I)$ is a function of the two Lab values under illuminant I.

As shown above, the delta-E is based on the Lab values under the illuminant in question. Accordingly, pre-computing in the off-line phase Lab values under all the illuminants referenced in objective function 141 for the samples in the sample set S can ordinarily improve runtime performance in the on-line phase.

Second Embodiment of the Objective Function

A different gamut mapping intent other than a spectral match can be used. In particular, an objective function for minimal color inconstancy can be used for objective function 141, rather than an objective function for spectral match. One goal of using an objective function for spectral match, such as Equation 16 above, is to obtain a spectral match between an input spectral reflectance and a reproduction under an arbitrary illuminant. On the other hand, a goal of using an objective function for minimal color inconstancy is to have a reproduction that will retain the same color appearance under arbitrary illuminants as under a reference illuminant. In other words, when using an objective function for minimal color inconstancy, the gamut mapping attempts to choose among different possible samples such that the matching sample will look the same under arbitrary illuminants as under a reference illuminant, such as D50. In general, assume that a reference illuminant $I_0$, e.g. D50, has been chosen, and a set of N illuminants $I_1, I_2, \ldots, I_{N-1}$ (other than $I_0$) has also been chosen. An objective function for minimal color inconstancy can be defined as:

$$\text{Obj2}(s) = \max_{I \in \{I_1, I_2, \ldots, I_{N-1}\}} CII(s, I, I_0) \quad \text{(Equation 24)}$$

Here, s is a spectral reflectance coming from the sample set S, and $CII(s,I,I_0)$ is a color inconstancy index of s under illuminant I. The color inconstancy index measures a predicted difference in color appearance of the spectral reflectance s as the illuminant changes from $I_0$ to I. The color inconstancy index can be calculated as follows. First, the CIEXYZ values of s under illuminants $I_0$ and I are calculated using Equations 3 to 5 above, respectively applied to $I_0$ and I to obtain corresponding CIEXYZ values $(X_0, Y_0, Z_0)$ and $(X,Y,Z)$.

Next, the CIEXYZ values of the white points of illuminants $I_0$ and I are determined. These values can be determined by the same Equations 3 to 5, but with $s(\lambda)=1$, which corresponds to the "perfect diffuser". The resulting CIEXYZ values of the white points can be denoted respectively by $(X_0^W, Y_0^W, Z_0^W)$ and $(X^W, Y^W, Z^W)$. These CIEXYZ values are converted to the CAT02 RGB space by the following equation:

$$\begin{pmatrix} R_0^W \\ G_0^W \\ B_0^W \end{pmatrix} = M_{CAT02} \begin{pmatrix} X_0^W \\ Y_0^W \\ Z_0^W \end{pmatrix} \quad \text{(Equation 25)}$$

$$\text{where } M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix}$$

There is a similar equation for $(X^W, Y^W, Z^W)$ to convert to $(R^W, G^W, B^W)$. The "corresponding" CIEXYZ value $X_c Y_c Z_c$ of the spectral reflectance s under the reference illuminant $I_0$ is determined by the following equation:

$$\begin{pmatrix} X_c \\ Y_c \\ Z_c \end{pmatrix} = M_{CAT02}^{-1} \begin{pmatrix} R_0^W / R^W & 0 & 0 \\ 0 & G_0^W / G^W & 0 \\ 0 & 0 & B_0^W / B^W \end{pmatrix} M_{CAT02} \begin{pmatrix} X \\ Y \\ Z \end{pmatrix} \quad \text{(Equation 26)}$$

Finally, $CII(s,I,I_0)$ is determined to be the delta-E between $(X_0, Y_0, Z_0)$ and $(X_c, Y_c, Z_c)$ under illuminant $I_0$. As discussed above, the delta-E calculation can use any of the delta-E equations such as $\Delta E_{ab}$ or $\Delta E_{94}$ and involves converting the XYZ values to Lab values under the illuminant $I_0$ using Equations 6 to 9. It can be appreciated that $CII(s,I,I_0)$ is dependent only on the sample s and not on the input color value at runtime during the on-line phase. Accordingly, Obj2 given by Equation 24 is also dependent only on the sample s and can be pre-computed during the off-line phase.

Returning to FIG. 4 and the description of step S3600, the computation of the auxiliary computational data structure may anticipate the objective function 141 used in the on-line phase and pre-compute as many colorimetric attributes as needed in order to support all the anticipated objective functions. In particular, an auxiliary computational data structure supporting Obj1 given by Equation 16 and Obj2 given by Equation 24 is illustrated in FIG. 14. It is noted that Obj2 can be completely pre-computed during the off-line phase. For Obj1, it can be seen from Equation 16 that the delta-E under each illuminant in the predetermined set of illuminants is required. As discussed before, each delta-E is dependent only on the Lab value of the input color value and the Lab value of the sample in the sample set S. With the Lab values of all the samples in S pre-computed during the off-line phase, only the Lab value of the input color value under each illuminant needs to be computed at runtime during the on-line phase. Thus, it is ordinarily possible to improve runtime performance using the auxiliary computational data structure.

It can be appreciated that the layout of the structure in FIG. 14 is only exemplary. Other structures can be constructed during the off-line phase to support different illuminants and/or different objective functions.

It can further be appreciated that the inclusion of the auxiliary computational data structure in the off-line phase is not mandatory. Without the auxiliary computational data structure available during the on-line phase, the objective function result corresponding to each sample can still be computed directly from the spectral reflectance of each sample, at the cost of a hit in runtime performance.

This completes the description of step S3600 in FIG. 4 and also the description of the example embodiment of the off-line phase.

Embodiments of the On-Line Phase

Returning to FIG. 3, during the on-line phase in step S5000, CMM 135 instantiates forward spectral device model 140 from device profile 147. The instantiated forward spectral device model may or may not be used in step S6000 to perform a "refined search" depending on the various embodiments to be described in the following. In embodiments where a refined search is not performed, step S5000 may be omitted without affecting the spectral gamut mapping of step S6000.

In step S6000, spectral gamut mapping is performed by spectral gamut mapping module 142. At its highest level, spectral gamut mapping module 142 accepts input color value 150 and outputs output color value 155.

Depending on the embodiment of objective function 141, input color value 150 may take on different meaning. If objective function 141 is Obj1 given by Equation 16 above, input color value 150 can be a spectral reflectance array. A spectral reflectance array may comprise 31 dimensions of spectral reflectance data that represent reflectance at every 10 nm interval in the visible wavelength spectrum from 400 nm to 700 nm. If objective function 141 is Obj2 given by Equation 24 above, input color value 150 can be an XYZ value under a reference illuminant such as D50. Input color value 150 can correspond to a pixel of an input image obtained from network interface 109, DVD interface 119, or an interface to a source device, such as digital camera interface 126. Alternatively, the input image can also be obtained by CMM 135 from image files 148. Additionally, an input image can come from a capture device in the traditional sense, such as camera 60 or scanner 70, or from "color sets", such as from a reflective target (e.g., a Digital ColorChecker SG).

In various embodiments, S6000 outputs output color value 155 which can be an output device value, a spectral reflectance array corresponding to the output device value, or a monitor RGB value that simulates the appearance of the output device on a monitor. In the case where the output device is printer 90, output color value 155 can be an output device value for printer 90. In the case where the output device is a monitor that is used to simulate the output of printer 90 (for example), output color value 155 can be a monitor RGB value. In yet another case where a reflectance image is preferred, such as for archiving, output color value 155 can be a spectral reflectance array.

One goal of spectral gamut mapping is to map an input color value so that an output color value is within a spectral gamut of the output device. In a strict sense used by some researchers, spectral gamut mapping takes device independent colors and outputs device independent colors. Such a definition is especially prevalent in conventional gamut mapping in a color appearance space, which is device independent. For practical purposes, however, the result of gamut mapping has to be "materialized" by an output device. In other words, the result of gamut mapping has to be converted to device values. Conventionally, this step is achieved by invoking the "inverse device model" of the output device. In the following embodiments, "spectral gamut mapping" can include the final result of producing device values, and as discussed in more detail below, spectral gamut mapping module 142 can ordinarily avoid invoking an inverse spectral device model, which can be a very expensive computation.

FIG. 15 is a diagram illustrating the general steps in the spectral gamut mapping step S6000 of FIG. 3.

Briefly, accepting module 136 accepts input color value 150 and converting module 137 converts input color value 150 into a colorimetric value under the same reference illuminant used during the off-line phase. The converted colorimetric value includes a lightness in the lightness dimension, a chroma in the chroma dimension and a hue in the hue dimension. Identifying module 138 identifies subdivisions from the constrained subdivision structure of gamut mapping data structures 146 which fall within a tolerance of the converted colorimetric value using the lightness, chroma and hue of the converted colorimetric value. The samples within the identified subdivisions are searched by searching module 139 using the auxiliary computational data structure of gamut mapping data structures 146 and/or objective function 141 so as to find a sample that matches acceptably to input color value 150 relative to objective function 141. In addition, searching module 139 may optionally use the forward spectral device model instantiated in step S5000 depending on the embodiment of the searching module.

In more detail, when a user of host computer 41 chooses to print an image at printer 90, for example, accepting module 136 accepts a color value for each pixel of the input image. A single color value is accepted by accepting module 136 as input color value 150. Input color value 150 is a spectral reflectance array if the input image is a spectral image (such as from a calibrated multispectral camera), which corresponds to objective function 141 being Obj1 given by Equation 16. Input color value 150 is a colorimetric value under a reference illuminant if the input image is a colorimetric image (or equivalently, a calibrated RGB image), which corresponds to objective function 141 being Obj2 given by Equation 24.

Converting module 137 converts input color value 150 to colorimetric value 151 under a reference illuminant, such as D50. Converting module 137 can perform different steps depending on input color value 150. If input color value 150 is a spectral reflectance array, converting module 137 performs steps similar to the generation of colorimetric values in the off-line phase by using Equations 3 to 11 above. If the input color value 150 is a colorimetric value under the reference illuminant, such as an XYZ value, converting module 137 performs steps using Equations 6 to 11 above.

In addition, an optional colorimetric gamut mapping can be performed by converting module 137. If this optional gamut mapping is performed, then colorimetric value 151, i.e., LCh value, may be altered from the result of the conversion discussed above.

For example, if colorimetric value 151 is outside the colorimetric gamut under the reference illuminant, converting module 137 may apply a colorimetric gamut mapping to bring colorimetric value 151 to within the colorimetric gamut of the output device.

Figure 16:
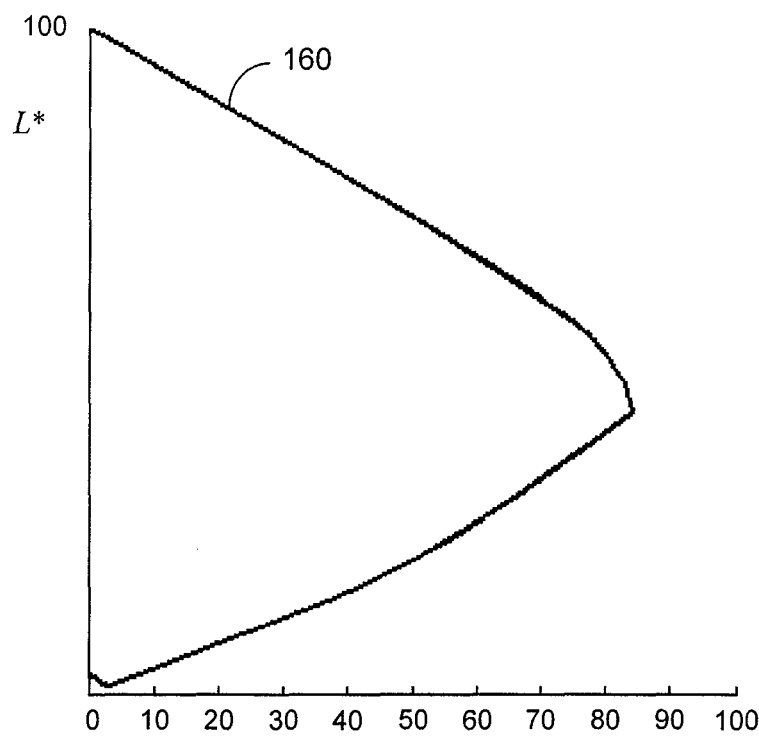
FIG. 16 is a diagram illustrating the geometric boundary of a hue leaf.

Many different types of colorimetric gamut mapping methods can be used. One type of colorimetric gamut mapping includes hue-preserving methods. Such hue-preserving methods use a geometric boundary of a hue leaf that can conveniently be determined using the samples of the constrained subdivisions as described herein. More specifically, for a given hue integer h, a subset of samples, denoted $\hat{S}_h$, pertaining to this hue has been described above in reference to FIG. 9. However, due to the erratic change in hue for near-neutral colors, the samples in this hue leaf may not cover the region near the neutral axis sufficiently. This is apparent in FIG. 12B, which shows that a given subdivided hue leaf does not completely cover the neutral axis. To remedy this, the samples of the neutral spine in $\hat{S}_{neutral}$ are included in the determination of the geometric boundary of the hue leaf. In other words, all the samples in $\hat{S}_h \cup \hat{S}_{neutral}$ are used in the construction of the geometric boundary of the hue leaf. For example, the hue components of these samples are first discarded (so that the samples now lie in a two-dimensional $L^*C^*_{ab}$ plane) either if the hue components are within one degree from h, or if the samples are near-neutrals. A convex hull construction can then be performed in the two-dimensional plane using the lightness and chroma of the samples to determine the geometric boundary of the hue leaf. An example of a resulting hue leaf boundary is shown as geometric boundary 160 in FIG. 16.

Figure 17A:
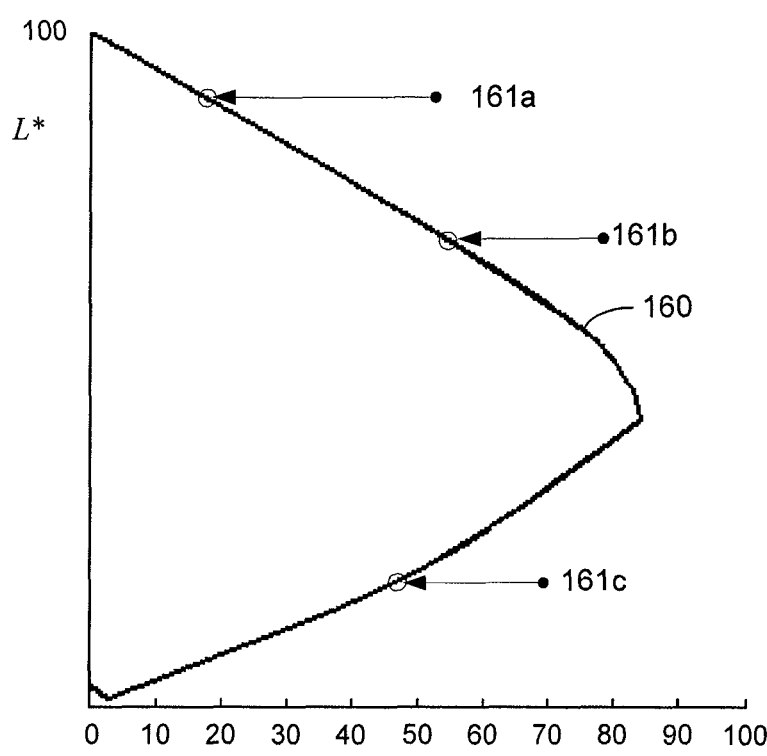
FIG. 17A illustrates examples of constant lightness clipping onto a hue leaf boundary.
Figure 17B:
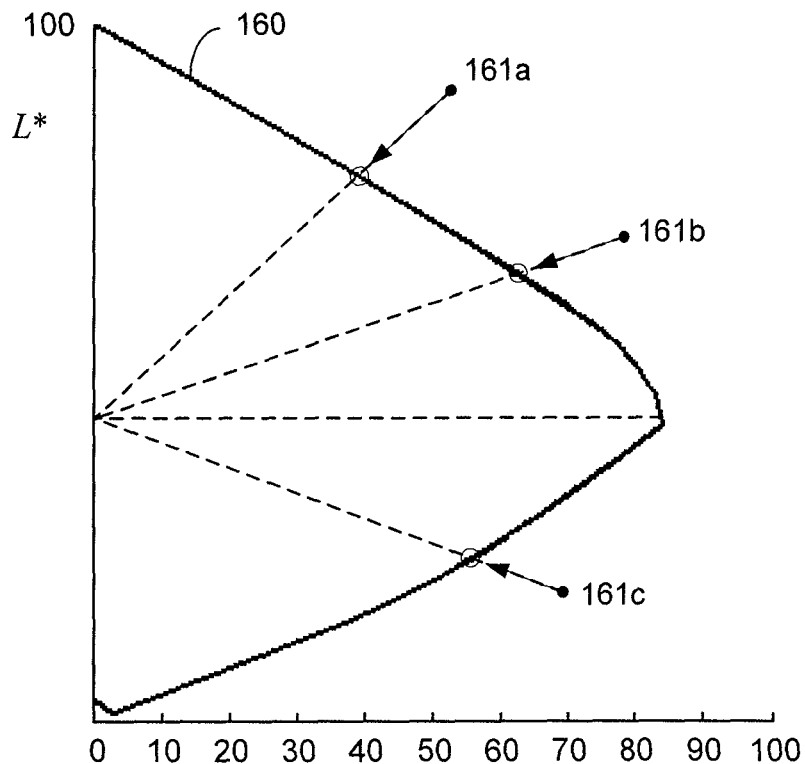
FIGS. 17B and 17C illustrate examples of gamut mapping strategies for optional colorimetric gamut mapping onto a hue leaf boundary.
Figure 17C:
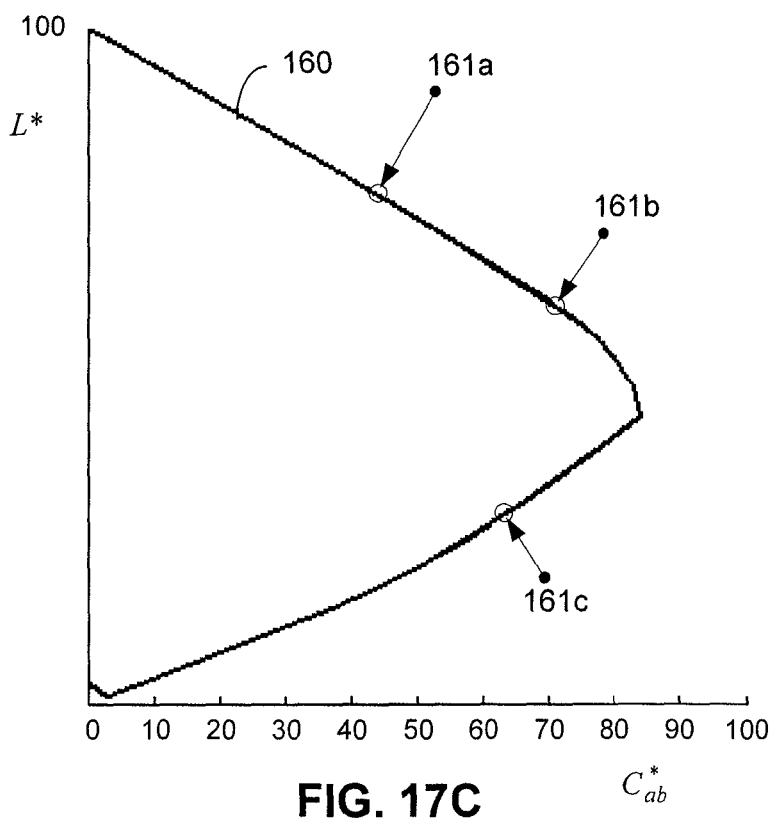

With a geometric representation of the boundary of the hue leaf, various gamut mapping methods can then be implemented. For example, as shown in FIG. 17B, out-of-gamut colors 161a, 161b and 161c are clipped towards the lightness on the neutral axis corresponding to the cusp. Another strategy is to clip to the closest point on the boundary, as shown in FIG. 17C. For comparison, if the optional colorimetric gamut mapping is not applied, the equivalent result of identifying module 138 will be a constant lightness mapping, as shown in FIG. 17A.

Referring again to FIG. 15, whether an optional colorimetric gamut mapping has been applied or not by converting module 137, colorimetric value 151 will be passed on to identifying module 138. Identifying module 138 then identifies subdivisions of samples within the spectral gamut of printer 90 by using the constrained subdivision structure of gamut mapping data structures 146. In more detail, the constrained subdivision structure can include upper and lower bounds for the subdivisions and indices for the samples included within the subdivisions. Samples within identified subdivisions 152, in the form of indices to the samples in sample set S, are then provided to searching module 139.

Figure 18:
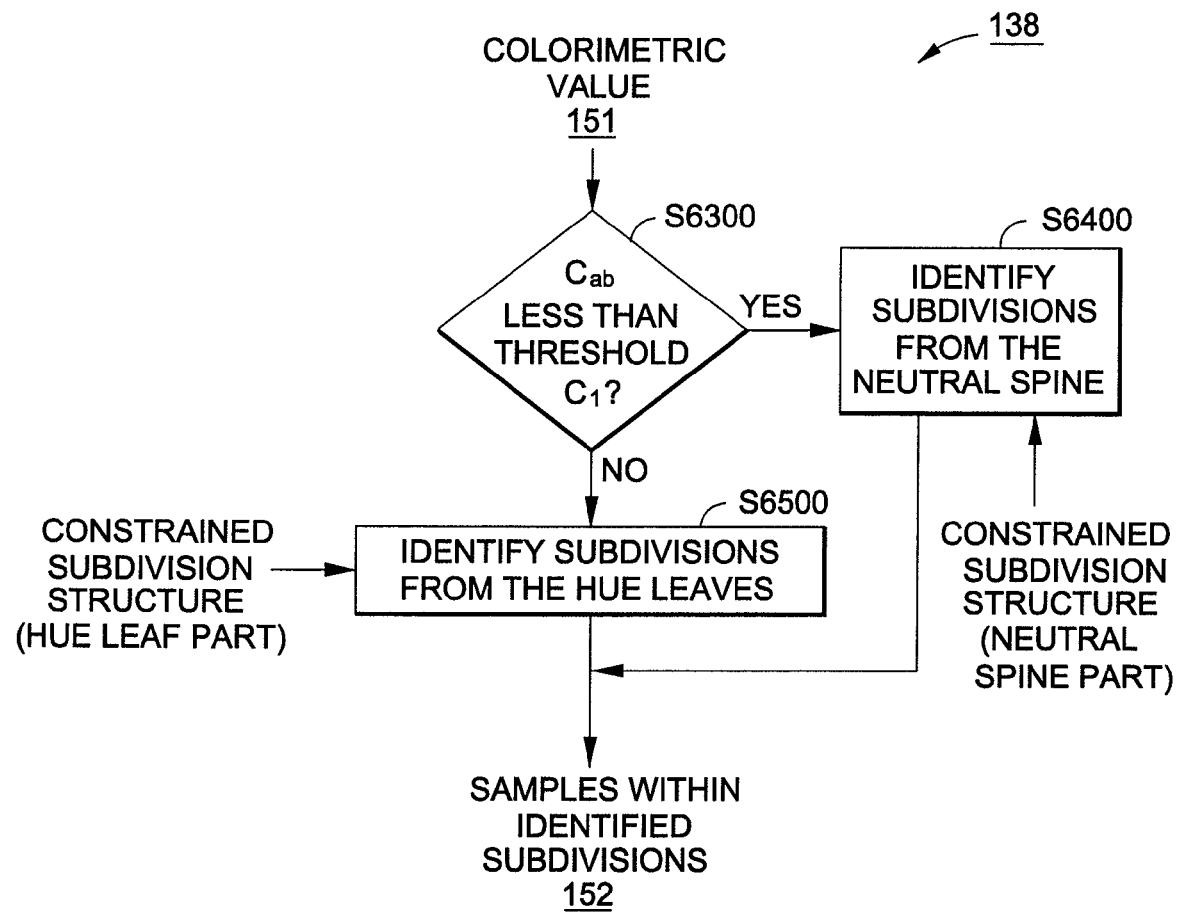
FIG. 18 is a flow diagram depicting the process steps in the identifying module in the on-line phase according to an example embodiment.

FIG. 18 provides a more detailed view of the steps performed by identifying module 138 in FIG. 15. In step S6300, identifying module 138 determines whether the chroma $C_{ab}$ of converted colorimetric value 151 is less than a threshold chroma $C_1$. This threshold is related to the threshold chroma $C_0$ used in the definition of the neutral spine during the off-line phase, but threshold aromas $C_0$ and $C_1$ do not need to be the same. In fact, the choice of $C_0$ is generally larger to ensure some overlapping with the hue leaves, as the intention of the neutral spine and the hue leaves is to "cover" the whole colorimetric gamut of the output device. In addition, some overlapping of subdivisions will ordinarily help to ensure smoother transitioning of the sample distribution between the hue leaves, and also between the neutral spine and the hue leaves.

In one embodiment, the choice of $C_1$ is determined based on a consideration of whether LCh values with chroma smaller $C_1$ would have a noisy hue angle. In other words, LCh values with a chroma less than $C_1$ would have so much noise in the hue angle so as to make the hue angle statistically unreliable. Generally, $C_1 < C_0$. For example, if $C_0 = 3$, then $C_1 = 2$ may be used.

In step S6300, if the chroma $C_{ab}$ of converted colorimetric value 151 is less than threshold chroma $C_1$, then the process proceeds to step S6400 to identify subdivisions from the neutral spine. In more detail, subdivisions from the neutral spine are identified that fall within a tolerance δ of the lightness of converted colorimetric value 151.

Figure 19:
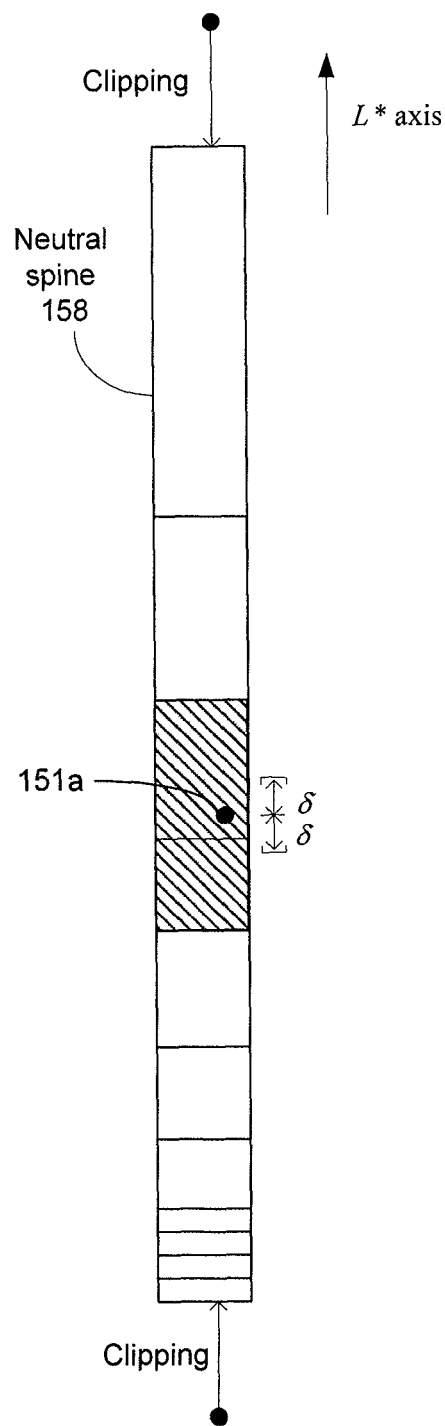
FIG. 19 is a representational view of identifying subdivisions in a neutral spine according to an example embodiment.

FIG. 19 is a representational view of identifying subdivisions in a neutral spine. As shown in FIG. 19, a clipping in the lightness dimension may first need to be performed if the lightness of colorimetric value 151 is not within the range between the minimum and maximum lightness of the neutral spine. This is necessary if colorimetric value 151 is outside the colorimetric gamut and optional colorimetric gamut mapping has not been performed by converting module 137 as described above. For comparison to the optional colorimetric gamut mapping methods discussed above, FIG. 17A illustrates the clipping of colors 161a, 161b and 161c along constant lightness when no optional colorimetric gamut mapping is applied.

In step S6400 of FIG. 18, an interval [L*−δ, L*+δ] is determined, where L* is the lightness of colorimetric value 151 (which may have been clipped if an optional colorimetric gamut mapping has been applied), and δ is a chosen tolerance related to a visual threshold. For example, δ=1 can be chosen based on the "just noticeable difference" (JND) of human vision. The covering subdivisions from the neutral spine that intersect this interval are then identified by comparing the interval with the upper and lower bounds stored in the neutral spine subdivision structure of the constrained subdivision structure. This identification is represented in FIG. 19, where the shaded region contains the identified subdivisions that are within a tolerance δ of the converted colorimetric value 151a.

If in step S6300, the chroma $C_{ab}$ of converted colorimetric value 151 is not less than threshold chroma $C_1$, then the process of FIG. 18 proceeds to step S6500 to identify subdivisions from the hue leaves.

In step S6500, the nearest integer hue corresponding to the hue of colorimetric value 151 is determined. Data for the subdivisions from the hue leaf corresponding to the integer are then retrieved from the hue leaf subdivision structure of the constrained subdivision structure. As a preliminary step, a clipping can be performed to make sure colorimetric value 151 lies within the hue leaf. More specifically, a clipping can be performed to make sure the lightness of colorimetric value 151 is within the range between the minimum and maximum lightness of the hue leaf. In addition, a clipping may also be performed to make sure the chroma of colorimetric value 151 is within the range between the minimum and maximum chroma of the hue leaf in the corresponding lightness range. Such preliminary clipping is ordinarily not performed if optional colorimetric gamut mapping is performed by converting module 137, as described above.

Figure 20:
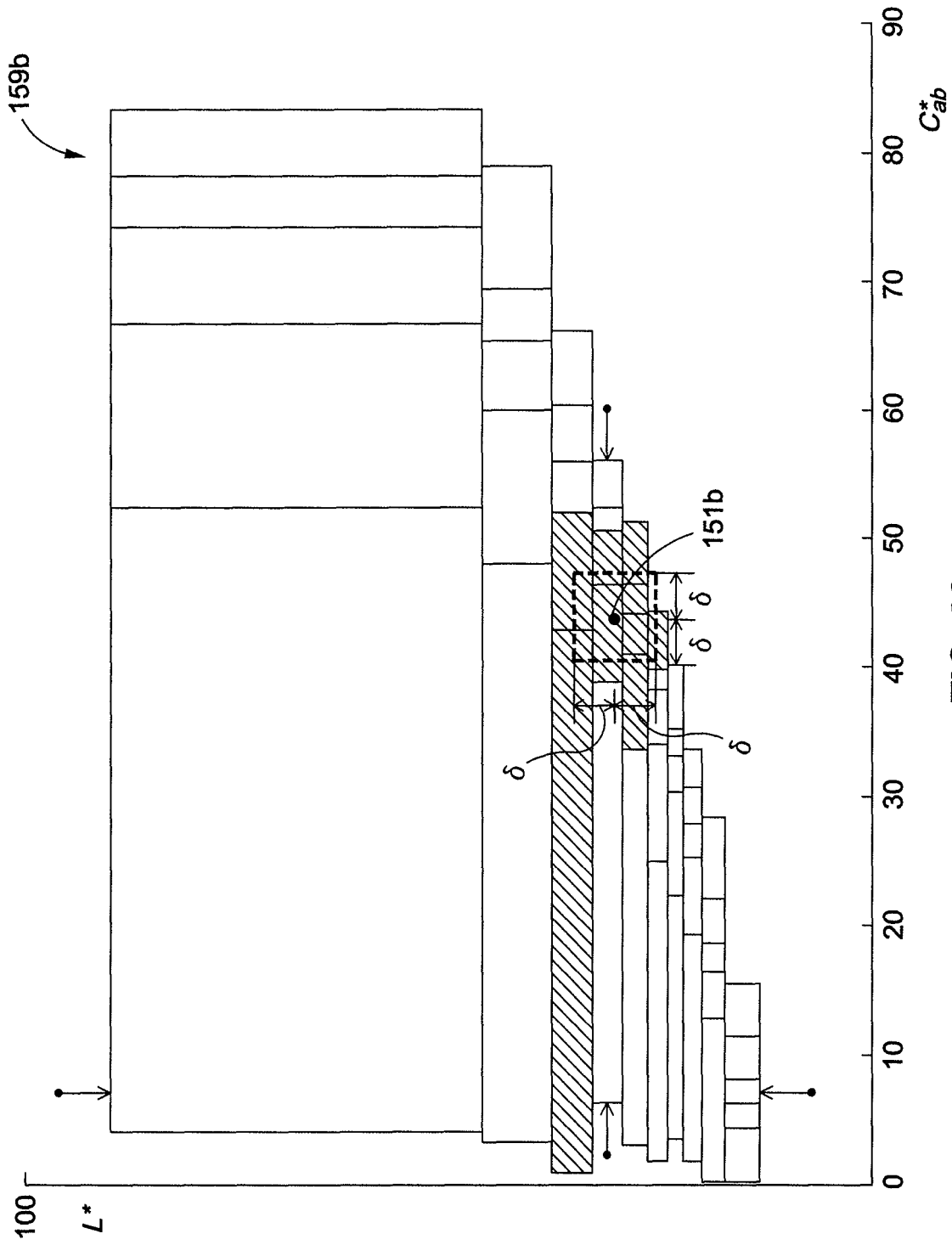
FIG. 20 is a representational view of identifying subdivisions in a hue leaf according to an example embodiment.

A box defined by lightness range [L*−δ, L*+δ] and chroma range [$C_{ab}$*−δ, $C_{ab}$*+δ] is then determined, where L* and $C^*_{ab}$ are the lightness and chroma, respectively, of colorimetric value 151. As in step S6400, δ is a chosen tolerance related to acceptable visual threshold. For example, δ=1 can be chosen based on the "just noticeable difference" (JND) of human vision. The covering subdivisions from the hue leaf that intersect this box are then determined by comparing the lightness and chroma ranges with the upper and lower bounds for lightness and chroma for subdivisions from the retrieved hue leaf subdivision structure. This is graphically represented in FIG. 20, where the shaded region contains the identified subdivisions of hue leaf 159b that fall within tolerance δ of converted colorimetric value 151b. In one example embodiment, the number of samples in the identified subdivisions ranges from approximately 100 to 2,000 samples, depending upon colorimetric value 151.

Referring to FIG. 15 again, various embodiments of searching module 139 are possible and will be described in the following. Briefly, searching module 139 searches samples within identified subdivisions 152 so as to find a sample that matches acceptably to the input color value relative to an objective function. In one embodiment, the result of the search is provided in the form of an "optimal sample index". Searching module 139 then looks up an output device value, spectral reflectance array or monitor RGB value that corresponds to the optimal sample index. It is noted that the look up procedure has a low computational cost because the tables of device values, spectral reflectance arrays or monitor RGB values can be pre-computed for the sample set S. In this manner, searching module 139 ordinarily avoids having to apply an inverse spectral device model, which can be a very computationally expensive procedure.

First Embodiment of the Searching Module

Figure 21:
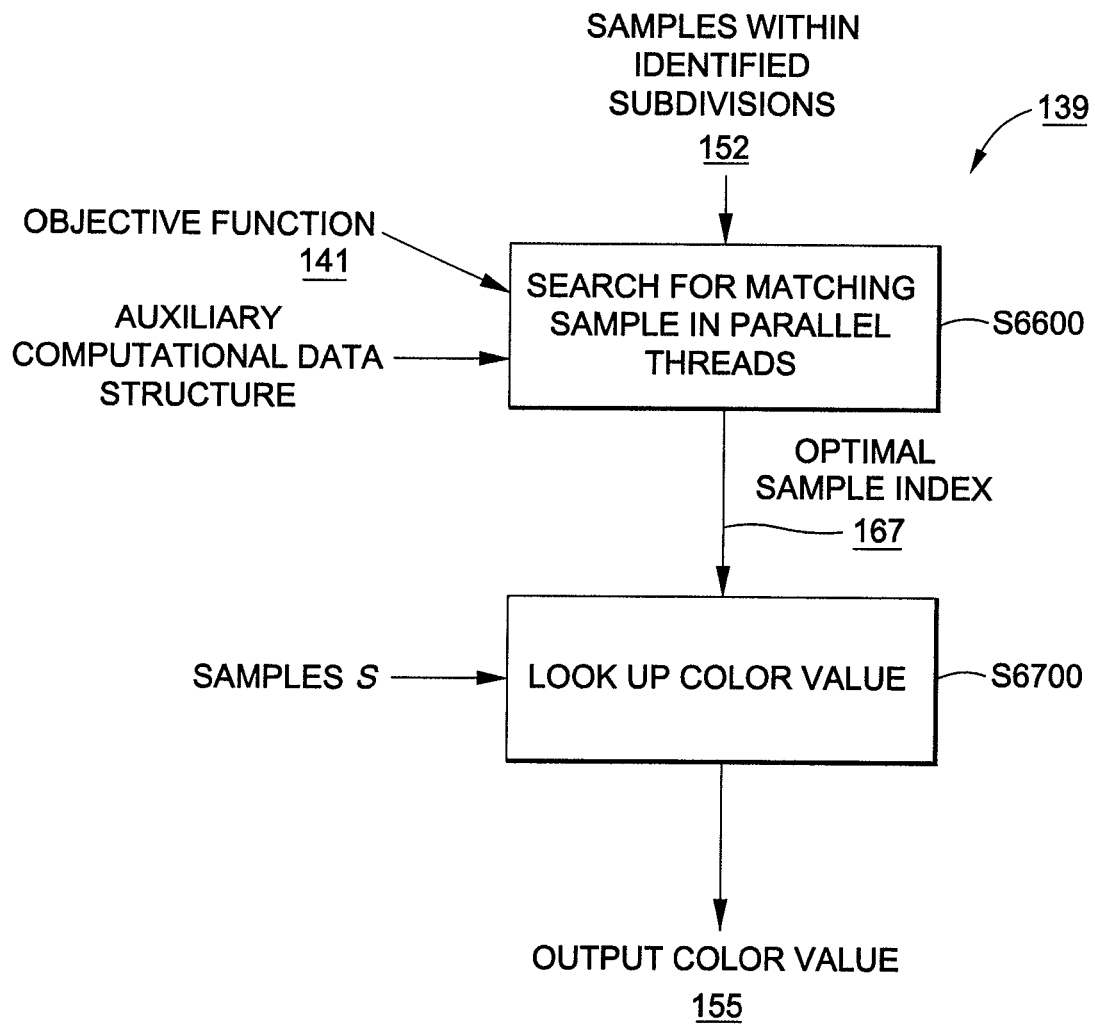
FIG. 21 is a flow diagram depicting the process steps according to a first example embodiment of the searching module in an on-line phase.

FIG. 21 depicts the process steps performed by searching module 139 according to a first example embodiment.

In step S6600, samples within identified subdivisions 152 are searched for a sample that matches acceptably to input color value 150 relative to objective function 141. The objective function result for each sample of the samples within identified subdivisions 152 is computed using the auxiliary computational data structure as described above, or alternatively, is computed directly using objective function 141. As explained before, the use of the auxiliary computational data structure allows certain quantities in objective function 141 to be pre-computed during the off-line phase and can ordinarily improve the runtime performance during the on-line phase significantly. In addition, it is noted that computation of each objective function result is independent of each other, which suggests that parallel computation can further improve the runtime performance.

Figure 22:
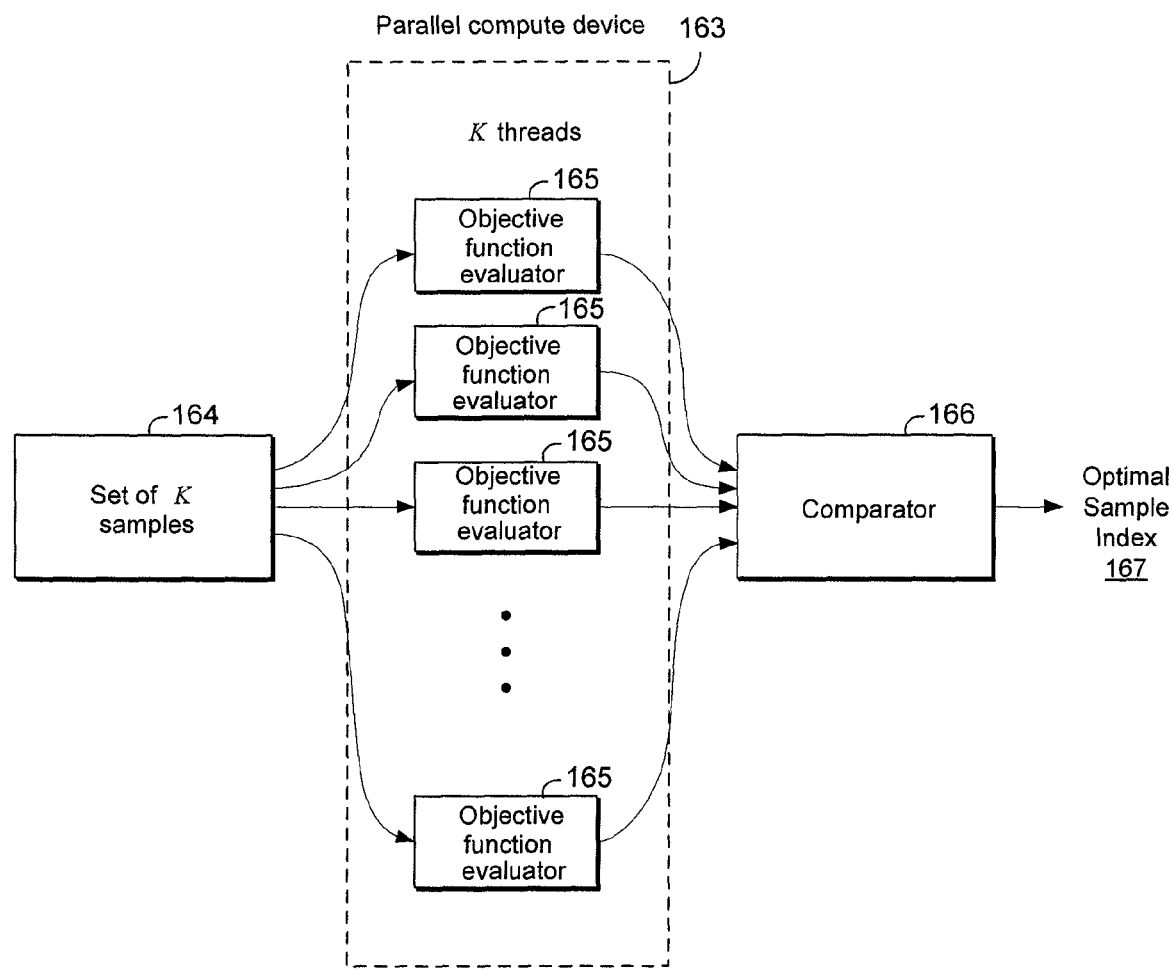
FIG. 22 illustrates an example of using a parallel compute device to search samples within identified subdivisions according to an example embodiment.

FIG. 22 illustrates an example of using parallel compute device 163 to search samples within the identified subdivisions. More specifically, it is noted that evaluation of the objective function for the samples in the identified subdivisions is independent of each other and can be done in parallel. In that regard, a set of K samples from the samples within identified subdivisions 152 can be input into parallel compute device 163 simultaneously. The number K depends on the architecture of parallel compute device 163, i.e., the number of threads parallel compute device 163 can handle without too much overhead penalty.

Each sample is processed by an objective function evaluator 165 that outputs an objective function result. Objective function evaluator 165 may comprise steps to invoke the auxiliary computational data structure. Alternatively, objective function evaluator 165 may comprise steps to invoke objective function 141 directly. The plurality of objective function results from objective function evaluators 165 are then compared by comparator 166 to determine, for example, optimal sample index 167.

Returning to FIG. 21, at step S6700, optimal sample index 167 is used to look up output color value 155. More specifically, during the off-line phase, sample set S has been generated which contains a set of samples, each with a device value, a spectral reflectance array and possibly other derivatives of spectral reflectance, such as an sRGB value for simulating spectral reflectance under predetermined viewing conditions.

In one embodiment, it may make sense to archive the output image as simply an "index map". More specifically, in certain applications, there may be a requirement to be able to switch from one output format to another on the fly. For example, an sRGB simulated image is first created to be displayed on a monitor, and upon inspection, if it is satisfactory, it will be outputted to a printer, which then requires the creation of an output printer device image. An index map comprises an output image in which each pixel is populated with the corresponding optimal sample index.

Figure 23:
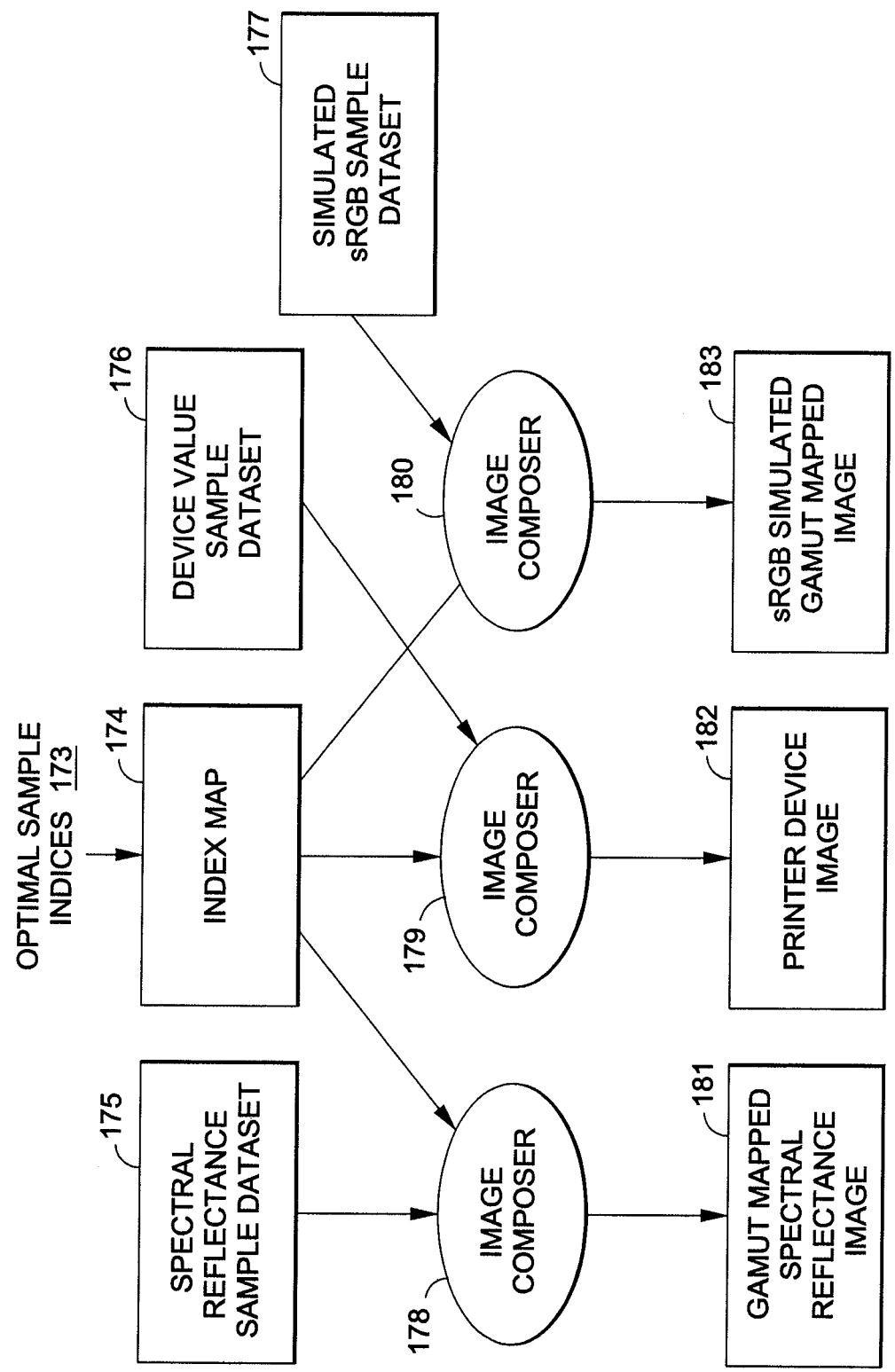
FIG. 23 is a diagram illustrating the use of an index map according to an example embodiment.

FIG. 23 illustrates the use of index map 174 according to an example embodiment. In this example embodiment, sample set S has been generated such that each sample is associated with a device value, a spectral reflectance and a simulated sRGB value, providing respectively spectral reflectance sample dataset 175, device value sample dataset 176 and simulated sRGB sample dataset 177.

Image composers 178, 179 and 180 each comprise computer-executable process steps stored in hard disk 45. Image composers 178, 179 and 180 perform simple look up steps using spectral reflectance sample dataset 175, device value sample dataset 176 and simulated sRGB sample dataset 177, respectively, to create gamut mapped spectral reflectance image 181, printer device image 182 and sRGB simulated image 183, respectively.

Second Embodiment of the Searching Module

Figure 24:
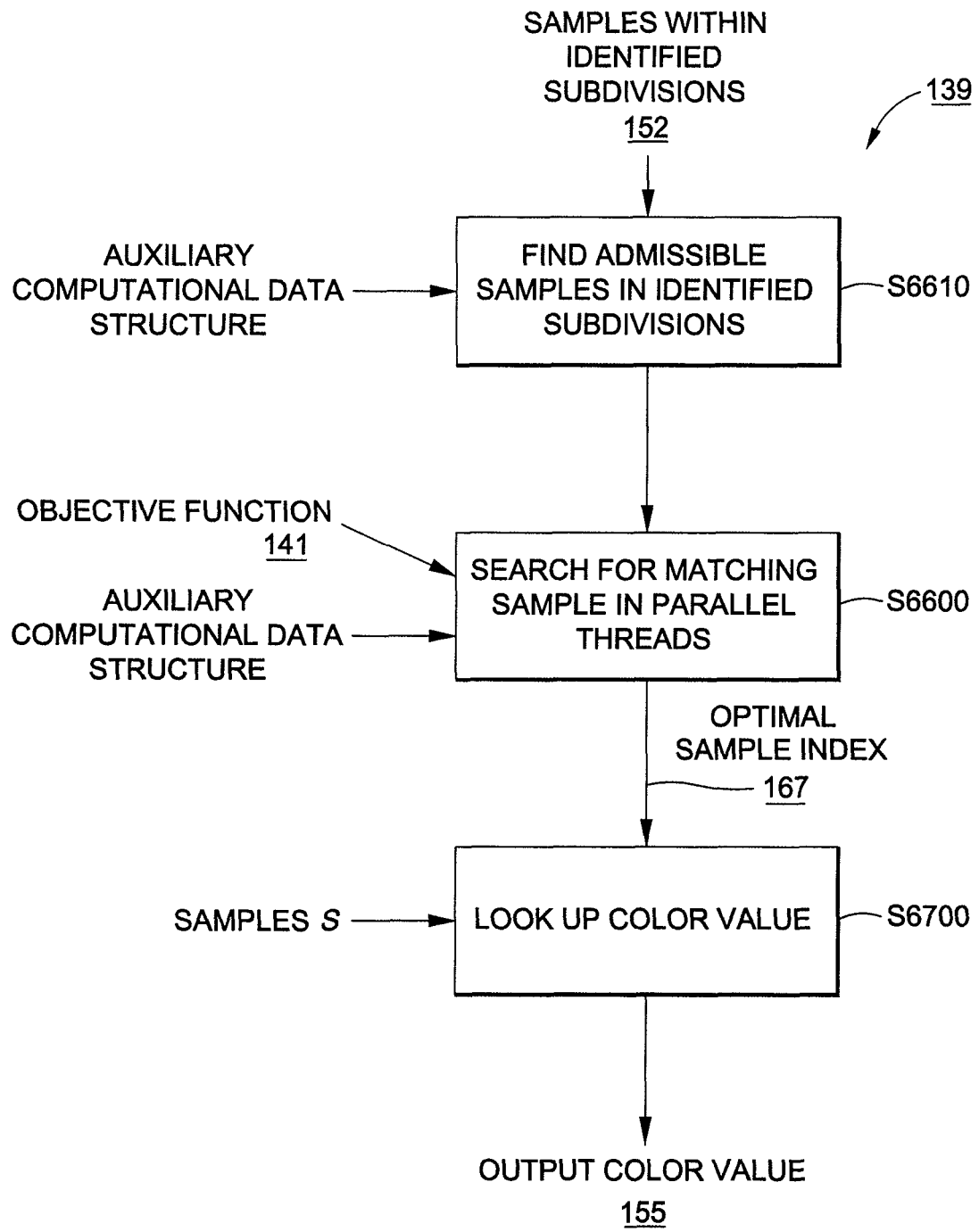
FIG. 24 is a flow diagram depicting the process steps according to a second example embodiment of the searching module in an on-line phase.

FIG. 24 depicts the process steps performed by searching module 139 according to a second example embodiment.

In step S6610, color differences are computed for each sample in the samples within identified subdivisions 152 and colorimetric value 151, and the samples yielding a color difference within a threshold are identified as admissible samples. More specifically, a color difference is evaluated between colorimetric value 151 and a given sample under the same reference illuminant used in the off-line phase. The color difference can be computed using a delta-E equation, such as Equation 17 or Equation 23 provided above.

Since delta-E equations are based on Lab values, auxiliary computational data structure, and more specifically the "LAB (D50)" column in FIG. 14, can be used to provide Lab values for each sample under the reference illuminant D50.

Alternative embodiments, particularly in the absence of an auxiliary computational data structure, may instead use the spectral reflectance arrays of each sample directly from the sample set S in order to evaluate the color differences.

Figure 25:
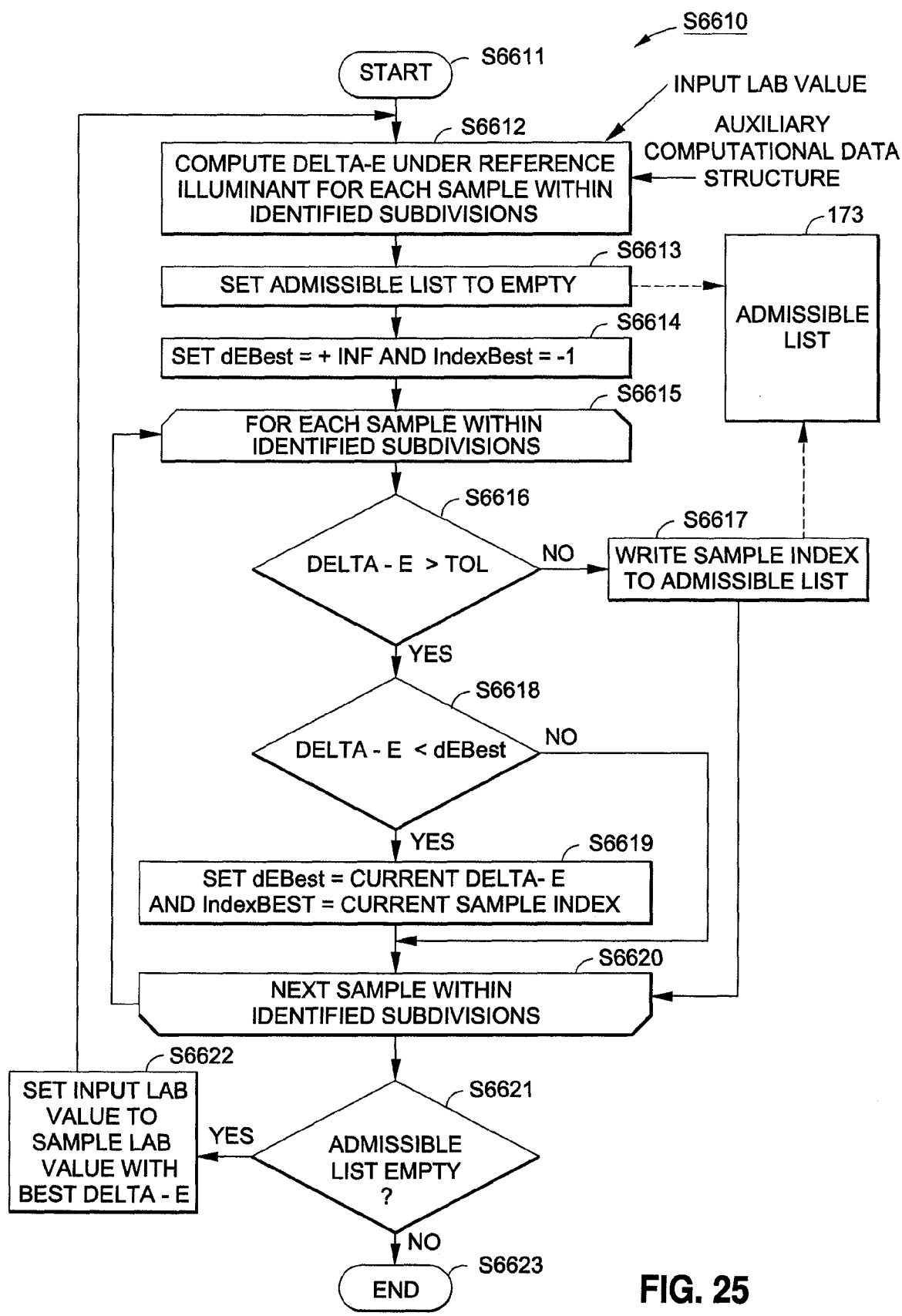
FIG. 25 is a flow diagram depicting the process steps in determining the admissible list according to an example embodiment.

FIG. 25 is a flow diagram illustrating the process steps for finding the admissible samples in step S6610 of FIG. 24.

Briefly, after starting at step S6611, color differences are computed for each sample in the identified subdivisions and the input Lab value in step S6612. A list of admissible samples is initially set to empty in step S6613. In step S6614, a value for a best color difference, dEBest, is initially set to a large value and an index for a sample with the best color difference, indexBest, is initially set to −1. Next, in the loop defined by S6615 and S6620, for each sample within the identified subdivisions, it is determined whether the sample's computed color difference is greater than a threshold, TOL, in step S6616. If the color difference is not greater than the threshold, an index of the sample is written to admissible list 173 in step S6617, and control goes to step S6620 to process the next sample within the identified subdivisions. On the other hand, if the color difference is greater than the threshold, it is determined in step S6618 whether the color difference is less than the best color difference, dEBest. If so, then dEBest is set as the current color difference and indexBest is set as the index of the current sample in step S6619. If the color difference is not less than dEBest in step S6618, then step S6619 is skipped and the process proceeds to the next sample within the identified subdivisions or proceeds to step S6621 if there are no more samples. In step S6621, it is checked whether admissible list 173 is empty, and if not, the process ends at step S6623. If admissible list 173 is determined to be empty in step S6621, the input Lab value is set as the sample Lab value with the best color difference. The process then returns to step S6612 to compute color differences for each sample within the identified subdivisions using the new input Lab value set in step S6622.

In more detail, the computation of color differences under the reference illuminant in step S6612 is accomplished in this example embodiment by accessing the auxiliary computational data structure as described above. The Lab value for each sample comes from the auxiliary computational data structure, whereas the input Lab value comes from colorimetric value 151. In alternative embodiments, the color differences can be evaluated without the auxiliary computational data structure by using the spectral reflectance arrays of each sample directly from the sample set S.

Because the color difference for each sample within the identified subdivisions can be independently computed, calculation of the color differences exhibits parallelism and can ordinarily be efficiently performed with parallel computing hardware, such as multicore CPU and many-core GPU.

In step S6613, admissible list 173 is initially set to empty in order to start the enumeration of the admissible list.

In step S6614, dEBest is set to a high value to ensure that at least one delta-E and at least one sample index will be set as dEBest and indexBest in step S6619. Step S6614 also sets indexBest to −1 to initialize indexBest, given that −1 is a value that does not correspond to any sample and therefore is an invalid index.

In the loop defined by S6615 and S6620, for each sample within the identified subdivisions, the delta-E for the current sample is checked to see whether it is greater than a threshold TOL. If the delta-E is less than or equal to TOL, then an index for the sample is written to admissible list 173 in step S6617, and control goes to step S6620 to process the next sample within the identified subdivisions.

In this example embodiment, threshold TOL is equal to 1 delta-E unit. As noted above, a delta-E of 1 represents color difference that is generally indiscernible to the human visual system. Therefore, admissible samples in this example are relatively close matches to colorimetric value 151 under the reference illuminant.

If the delta-E is greater than TOL in step S6616, then the process proceeds to step S6618 where it is determined whether the delta-E for the current sample is less than dEBest, which is the lowest delta-E checked thus far. If the delta-E for the current sample is less than dEBest, the process proceeds to step S6619. If the delta-E is not less than dEbest, step S6619 is skipped and the loop defined by S6615 and S6620 is repeated for the next sample within the identified subdivisions.

In step S6619, dEBest is set to the delta-E for the current sample and indexBest is set to the index of the current sample.

When the loop defined by S6615 and S6620 has been performed for each sample within the identified subdivisions, the process proceeds to step S6621 where it is checked whether admissible list 173 is empty. If admissible list 173 is empty, then there are no admissible samples and it is concluded that colorimetric value 151, or equivalently, the input Lab value, is outside the colorimetric gamut of the output device under the reference illuminant.

In this case, the process proceeds to step S6622 to set the input Lab value as the Lab value of the sample corresponding to indexBest.

The process then returns to step S6612 for computation of color differences for each sample in the identified subdivisions and the new input Lab value. Since the new input Lab value is in fact one of the samples within the identified subdivisions, the resulting admissible list will be nonempty, because the best sample from the last run is at zero delta-E from itself and will therefore be admissible. The rationale of this procedure is that if colorimetric value 151 is outside the colorimetric gamut under the reference illuminant, then the best sample from the last run, being the closest in-gamut sample to colorimetric value 151 under the reference illuminant, should be used as a new "center" for gathering admissible samples.

On the other hand, if it is determined in step S6621 that admissible list 173 is not empty, then the process ends at step S6623 and the indices of the admissible samples are provided to step S6600 of FIG. 24 to evaluate the objective function for the admissible samples. In evaluating the objective function for the admissible samples, the admissible samples can be considered to be all "equivalent" under the reference illuminant because the admissible samples all have delta-E's within the threshold.

Steps S6600 and S6700 of FIG. 24 are similar to the corresponding steps in the first embodiment of the searching module, with the exception that step S6600 takes as input the admissible samples in this embodiment instead of the samples within the identified subdivisions in the first embodiment.

Third Embodiment of the Searching Module

Figure 26:
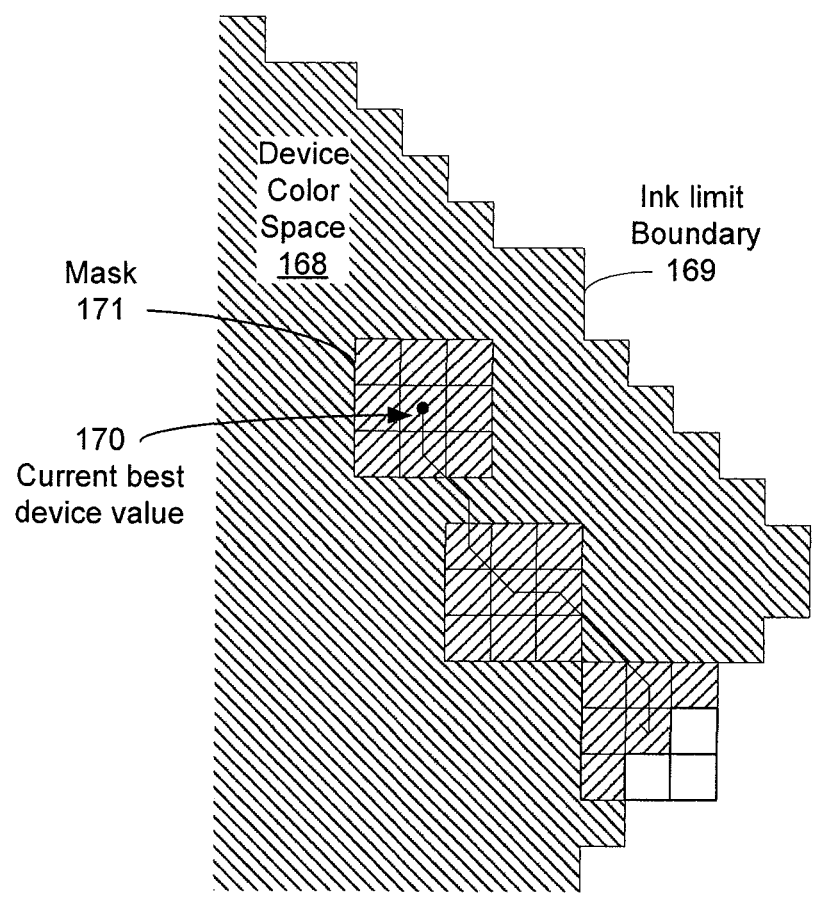
FIG. 26 is a representational view depicting a refined search according to a third example embodiment of the searching module in an on-line phase.
Figure 27:
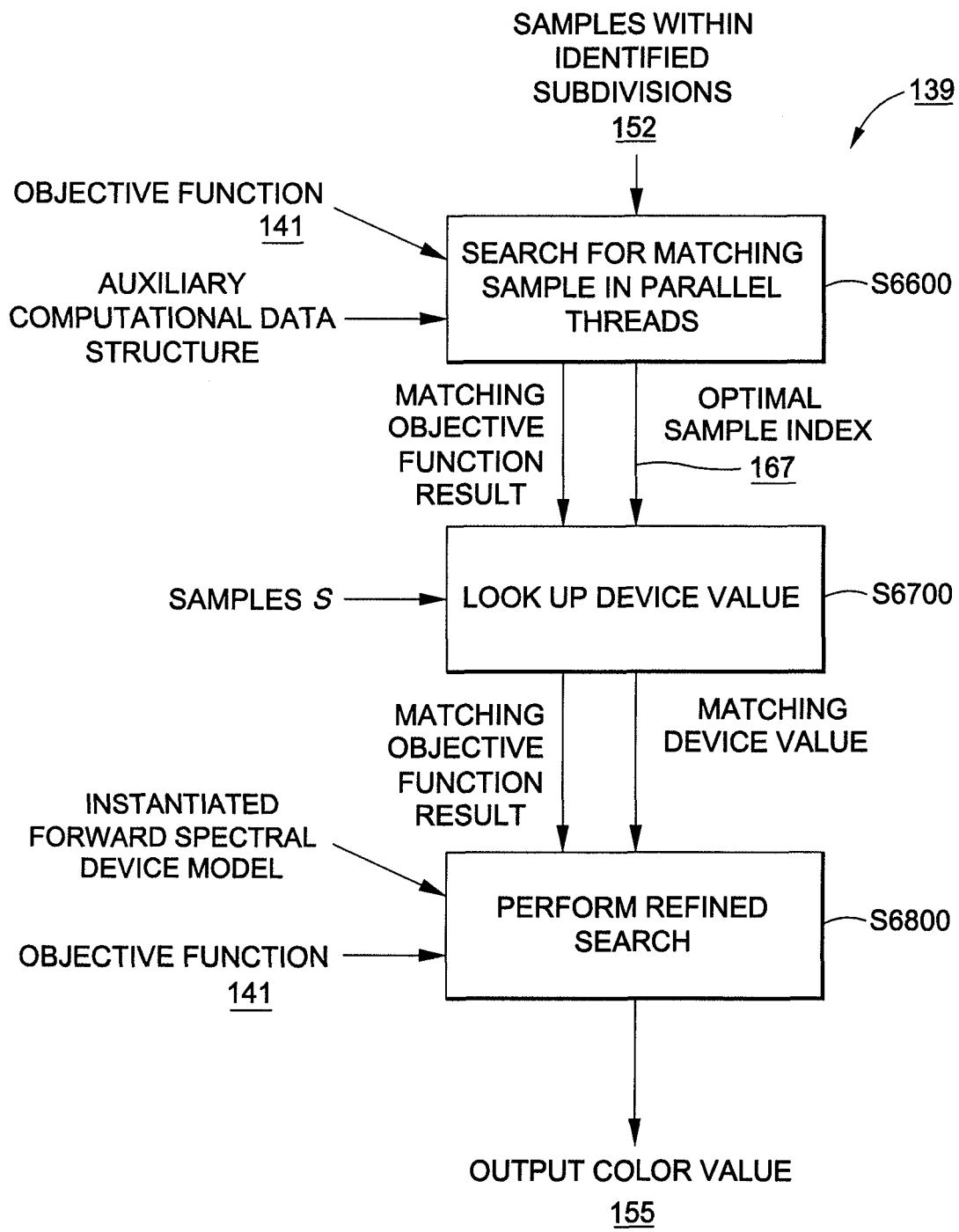
FIG. 27 is a flow diagram depicting the process steps according to a third example embodiment of the searching module in an on-line phase.
Figure 28:
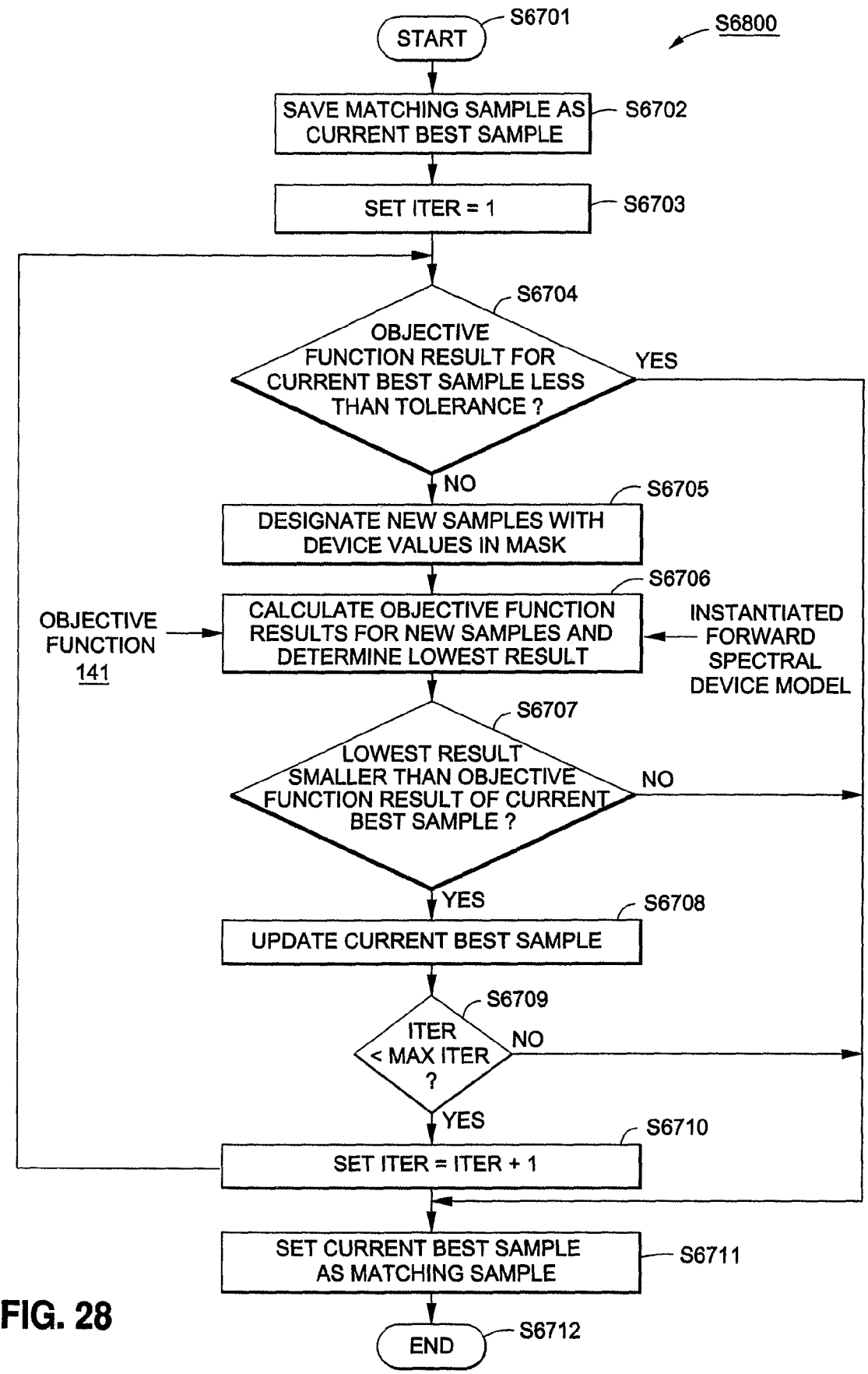
FIG. 28 is a flow diagram illustrating refined searching according to the third example embodiment of the searching module in an on-line phase.

FIGS. 26 to 28 illustrate searching samples within identified subdivisions according to a third example embodiment of the searching module. One way in which the third embodiment is different from the first and second embodiments is the addition of a refined search after a matching sample has been found. The refined search ordinarily improves the accuracy of the matching sample in a case where the matching sample does not match to the accepted color value to within a pre-designated tolerance. The accuracy of the matching sample is seen to be determined by the sampling accuracy of the sample set S, which in turn is limited by two factors related to the specification of device values in the off-line phase.

The first factor is the number of colorant combinations available in the specification of the device values. For example, if all the samples were designated by specifying at most three colorants, then the resulting sample set will not span the part of the spectral gamut that can only be reached by using four or more colorant combinations.

The second factor is the sampling rate used in specifying device values in the off-line phase. For example, if 52 steps are used in sampling three-colorant subspaces, the granularity is 5 digital counts out of 255 counts, or about 2%. Ideally, if the maximum number of steps are used (e.g., 256 steps), then the sampling would not have missed any possible samples in the three-colorant subspaces. However, using the maximum number of steps may result in too many samples for available computing resources such as processor speed, memory space, or hard disk space.

In the third embodiment, the matching sample from the search within the identified subdivisions is used as an initial seed in a refined search which is an iterative procedure that seeks to further minimize the objective function by generating new samples not present in the sample set S.

FIG. 26 illustrates a representational view of a refined search in device color space 168 to find a new sample with a lower objective function result. Device color space 168 comprises device values and is limited by ink limit boundary 169.

The initial starting location in device color space 168 is given by the matching device value that is the result of performing steps similar to the first or second embodiment of the online phase. In general, the current location in device color space 168, as given by current best device value 170, is advanced to a next location corresponding to a sample with a lower objective function result by moving "mask" 171 centered about current best device value 170. In the case of a printer, if the total number of inks is J, then one possible choice of mask 171 is the immediate neighborhood consisting of $3^J$ locations, including the center location of current best device value 170. For example, if J=6, the mask can consist of 729 device value locations.

In the case of a printer with large number of inks (e.g., J=12), to reduce the size of the mask, the mask can consist of neighboring locations with a limited number k (e.g., k=6) of "active inks" at a time. Note that for this to work, the initial matching device value should also have at most k active inks to begin with.

In addition, the size of mask 171 can be reduced by restricting mask 171 to only allowable ink combinations based on a total ink limit. This is indicated in FIG. 26 by the empty boxes of mask 171 which overlap ink limit boundary 169.

FIG. 27 is a flow diagram illustrating the process steps performed by searching module 139 according to the third example embodiment of the searching module. One main difference between the third embodiment and previous embodiments is the addition of step S6800, which performs a refined search.

Briefly, steps S6600 and S6700 are similar to the first embodiment discussed above in reference to FIG. 21. In an alternative version of this embodiment, the first steps can instead be similar to steps S6610, S6600 and S6700 of FIG. 24, as discussed in reference to the second embodiment. Note, however, that in the lookup step S6700 of the third embodiment, the device value specifically is looked up that corresponds to optimal sample index 167. In addition, the objective function result for the matching sample, which is a side product of the searching step S6600, is saved and passed along. In step S6800, a refined search is performed that iteratively specifies new device values in the device color space that are within a neighborhood of the current best device value. In the first iteration, the current best device value is the device value of the sample that matches acceptably to color value 150 resulting from the search step S6600.

In more detail, in step S6800, searching module 139 checks whether the matching sample matches input color value 150 within a pre-designated tolerance relative to objective function 141. If the matching sample matches input color value 150 within the pre-designated tolerance, the matching device value is output directly as output color value 155, or is converted to a requested format for output color value 155, such as a spectral reflectance array.

On the other hand, if the matching sample does not match input color value 150 within the pre-designated tolerance, new samples are designated by specifying new device values that are within a neighborhood of the device value corresponding to the matching sample provided from step S6600. The new device values are specified by considering all the device values within the neighborhood, wherein the size of the neighborhood is determined by a mask. In addition, the new device values in the neighborhood are further restricted to lie within an ink limit boundary. The spectral reflectance arrays corresponding to the new device values are then generated using the spectral forward device model instantiated in step S5000 of FIG. 3. The objective function results for the new device values are then computed using objective function 141, and the new device value with the lowest objective function result is determined. Depending on the requested format of color value 155, this device value is then output as output color value 155 or is converted to a different format for output color value 155, such as a spectral reflectance array.

FIG. 28 is a flow diagram illustrating the process steps of the refined search performed in step S6800 of FIG. 27.

Briefly, after starting at step S6701, the matching sample found in step S6700 of FIG. 27 is saved as the current best matching sample in step S6702. In step S6703, an iteration counter is set to 1. In step S6704, it is determined whether an objective function result for the current best matching sample is less than a tolerance. If the objective function result is not less than the tolerance, in step S6705, new samples are designated with device values within a mask defined in the device color space. Objective function results for the new samples are calculated and the lowest result of these objective function results is determined in step S6706. In step S6707, it is determined whether the lowest objective function result of the new samples is smaller than the objective function result of the current best sample. If step S6707 determines that the lowest objective function result of the new samples is not smaller than the objective function result of the current best sample, the current best sample is set as the matching sample in step S6711 and the process ends in step S6712.

On the other hand, if step S6707 determines that the lowest objective function result of the current best sample is smaller than the objective function result of the current best sample, the current best sample is updated by setting the new sample with the lowest objective function result as the current best sample in step S6708. In step S6709, it is checked whether the number of iterations is less than a maximum number of iterations, MaxIter. If the maximum number of iterations has been reached, the current best sample is set as the matching sample in step S6711 and the process ends in step S6712. If the maximum number of iterations has not been reached, the iteration count, Iter is incremented in step S6710 and the process returns to step S6704.

In more detail, after starting at step S6701, the matching sample found in step S6700 of FIG. 27 is saved as the current best matching sample in step S6702. In this example embodiment, the matching sample is a device value corresponding to optimal sample index 167.

In step S6703, an iteration counter, Iter, is set to 1. This iteration counter indicates the number of times the loop formed between step S6703 and step S6710 has been performed.

In step S6704, it is determined whether an objective function result for the current best matching sample is less than a tolerance. In this example, the objective function result of the first current best matching sample has already been calculated in step S6600 of FIG. 27. This objective function result is saved and passed along onto step S6800.

Comparing the objective function result of the current best matching sample to the tolerance in step S6704 ordinarily avoids unnecessary further calculations if the objective function result of the current best matching sample is already below an acceptable visual threshold. For example, if the objective function of Equation 16 is used, then a tolerance of 1 can be used. If the objective function result is below 1, then the delta-E's under the chosen set of illuminants will all be less than 1, which means that the color difference between input spectral color value 150 and the current best matching sample is generally indiscernible under those illuminants. In other words, there is little use in continuing to search for new samples with a lower objective function result. Accordingly, if the objective function result for the current best matching sample is less than the tolerance in step S6704, the process proceeds to step S6711 to set the current best sample as the matching sample.

If the objective function result for the current best matching sample is not less than the tolerance, the process proceeds to step S6705 to designate new samples. In step S6705, the new samples are designated by specifying device values within a mask in the device color space. As described above in reference to FIG. 26, a mask is defined in the device color space as an immediate neighborhood centered about the device value corresponding to the current best sample.

In step S6706, spectral reflectance arrays are generated for the new samples by processing the new device values through the forward spectral device model instantiated in step S5000 of FIG. 3. Objective function results for each new sample are then calculated using objective function 141. The objective function results for the new samples are then compared to find the sample with the lowest objective function result.

In step S6707, it is determined whether the lowest objective function result calculated in step S6706 is smaller than the objective function result of the current best sample. If the lowest objective function result is not smaller than the objective function result of the current best sample, the process proceeds to step S6711 to set the current best sample as the matching sample.

On the other hand, if it is determined in step S6707 that the lowest objective function result calculated in step S6706 is smaller than the objective function result of the current best sample, the current best sample is updated in step S6708 by setting the new sample with the lowest objective function result as the current best sample.

In step S6709, it is checked whether Iter is less than a maximum number of iterations, MaxIter. The MaxIter parameter is used to control the maximum allowed number of iterations of the loop formed between steps S6704 and S6710. The maximum number of iterations is reached in a situation where an objective function result less than the tolerance in step S6704 has not been obtained, and the iterations are forced to terminate to either avoid infinite looping or otherwise taking too much time.

The value for MaxIter can correspond to the sampling rate of the device color space in designating samples during the off-line phase. In one example, where a sampling rate of ink channels is 5 digital counts apart, a practical value for MaxIter is between 5 and 10 if the mask advances the ink channels by ±1 digital count.

After the iterations are terminated by either steps S6704, S6707 or S6709, the current best sample is set as the matching sample in step S6711 before ending the process at step S6712.

Figure 29A:
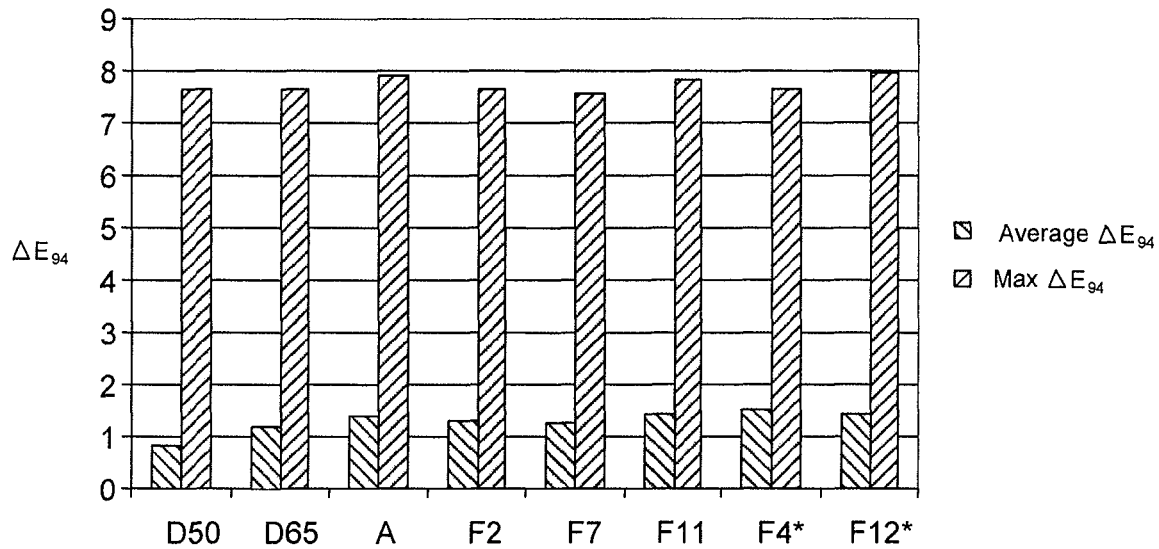
FIGS. 29A and 29B are bar graphs illustrating example error statistics for average and maximum delta-E's under various illuminants when using the third example embodiment of an on-line phase.
Figure 29B:
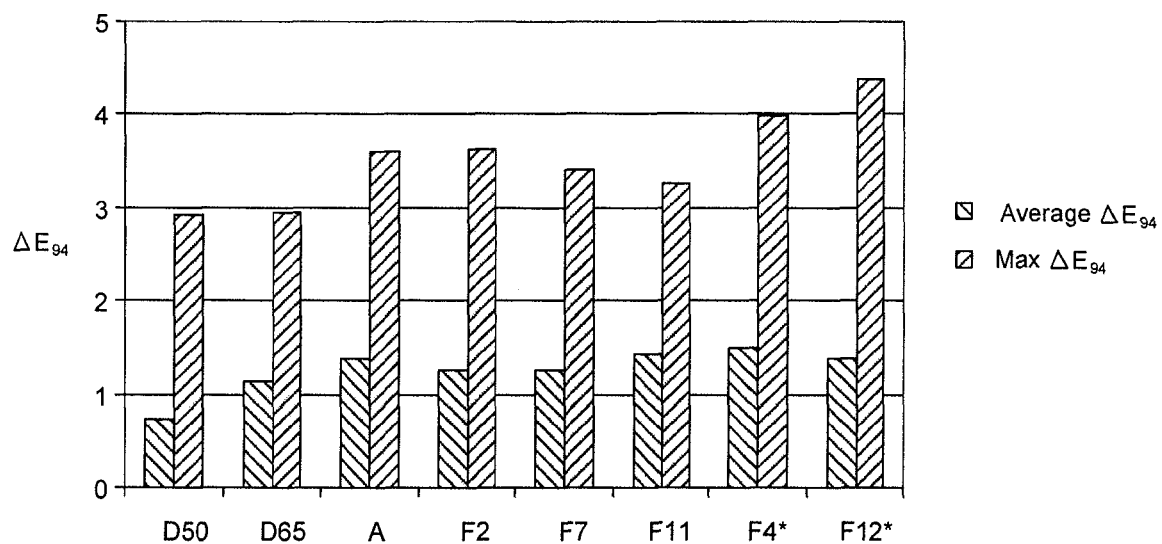

FIGS. 29A and 29B are bar graphs illustrating example error statistics for average and maximum delta-E's under various illuminants when using the third example embodiment of the searching module. Specifically, FIGS. 29A and 29B show average and maximum delta-E's under various illuminants using the third embodiment for a printer using three-ink combinations as applied to two sets of input colors arising from the ColorChecker DC. The delta-E's under illuminants F4 and F12 are also shown to illustrate how the result fares for illuminants not explicitly included in the definition of the objective function. As shown in FIGS. 29A and 29B, the results for these illuminants are not significantly different from the illuminants that are explicitly included in the objective function. This accords with one goal of spectral gamut mapping, which is to provide a good match under arbitrary illuminants.

FIG. 29A includes all 240 colors from the ColorChecker DC. While the average delta-E under each illuminant is approximately 1, which corresponds to a color difference generally indiscernible to the human eye, the maximum delta-E's are relatively high. This is caused by colors that are outside the D50 colorimetric gamut. When a color is out of the colorimetric gamut, delta-E will be high, and there is little gamut mapping can do about it.

FIG. 29B shows the same statistics, but with the out-of-colorimetric-gamut colors removed from the original 240 colors. While the average delta-E's remain basically the same as before, the maximum delta-E's have decreased significantly to an acceptable level.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of determining a spectral gamut of a device during an off-line phase by constructing plural subdivisions of a set of samples spanning the spectral gamut, the method comprising:

designating the set of samples by specifying plural device values in a device color space;

generating a spectral reflectance array for each sample using the device value corresponding to the sample;

generating a colorimetric value for each sample by transforming the spectral reflectance array corresponding to the sample under a reference illuminant, wherein the colorimetric value includes a lightness in a lightness dimension, a chroma in a chroma dimension and a hue in a hue dimension; and subdividing the set of samples into subdivisions based on the lightness, the chroma and the hue of the samples such that the number of samples in each subdivision is limited by a predetermined number, whereby in an on-line phase of spectral gamut mapping, subdivisions are identified that contain samples that are candidates for an acceptable match to an input color value which is given in the on-line phase, and an acceptably matching sample from the candidate samples in the identified subdivisions is determined relative to an objective function.

2. A method according to claim 1, wherein the device is a printer and the designating step includes restricting a maximum number of inks to be used out of a total number of inks available when printing a color.

3. A method according to claim 1, wherein said generating a spectral reflectance array for each sample includes processing the device value through a forward spectral device model for the device.

4. A method according to claim 1, wherein the subdividing step includes subdividing the set of samples into subdivisions based on a neutral spine and hue leaves in a lightness-chroma-hue (LCh) space.

5. A method according to claim 1, wherein in each subdivision there are approximately the same number of samples as in all other subdivisions.

6. A method according to claim 1, wherein in each subdivision there are at least a second predetermined number of samples.

7. A method according to claim 1, further comprising:

generating one or more colorimetric attributes for each sample in the set of samples for calculating the objective function, wherein a colorimetric attribute includes a colorimetric value under an illuminant, a color inconstancy index from an illuminant to a reference illuminant, or a combination of multiple such colorimetric attributes.

8. A method of spectral gamut mapping a color value in a color space for a device during an on-line phase, wherein a spectral gamut of the device is determined during an off-line phase by constructing plural subdivisions of a set of samples spanning the spectral gamut, the method comprising:

accepting the color value in the color space;

converting the color value into a colorimetric value under a reference illuminant, wherein the converted colorimetric value includes a lightness in a lightness dimension, a chroma in a chroma dimension and a hue in a hue dimension;

identifying subdivisions of the set of samples which fall within a tolerance of the converted colorimetric value by using the lightness, the chroma and the hue of the converted colorimetric value;

whereby the subdivisions are constructed during the off-line phase which designates the set of samples by specifying plural device values in a device color space, generates a spectral reflectance array for each sample, generates a colorimetric value for each sample by transforming the spectral reflectance array corresponding to the sample under the same reference illuminant used during the on-line phase, wherein each colorimetric value includes a lightness in the lightness dimension, a chroma in the chroma dimension and a hue in the hue dimension, and wherein the set of samples are subdivided based on their lightness, chroma and hue such that the number of samples in each subdivision is limited by a predetermined number; and wherein the method further comprises:
searching the samples within the identified subdivisions so as to find a sample that matches acceptably to the accepted color value relative to an objective function.

9. A method according to claim 8, wherein the converting step includes a colorimetric gamut mapping of the converted colorimetric value if the converted colorimetric value is outside a colorimetric gamut of the device.

10. A method according to claim 8, wherein the searching step includes calculating objective function results for the samples in the identified subdivisions in parallel.

11. A method according to claim 8, wherein the searching step includes finding a sample in the identified subdivisions yielding the lowest result for the objective function.

12. A method according to claim 8, wherein the objective function is equal to a maximum value among multiple values resulting from a color difference equation evaluated under multiple illuminants for the accepted color value and for the spectral reflectance array of a given sample in one of the identified subdivisions.

13. A method according to claim 8, wherein the objective function is equal to a maximum value among multiple values resulting from a color inconstancy index evaluated from multiple illuminants to the reference illuminant for the spectral reflectance array of a given sample in one of the identified subdivisions.

14. A method according to claim 8, wherein the searching step includes finding admissible samples in the identified subdivisions which yield a color difference within a threshold between the accepted color value and a spectral reflectance array of a given admissible sample under the reference illuminant, and wherein the searching step further includes finding an acceptably matching sample out of the admissible samples which yields the lowest result for the objective function.

15. A method according to claim 8, further comprising designating new samples by specifying new device values in the device color space that are within a neighborhood of the device value of the sample that matches acceptably to the accepted color value, and searching among the new samples for a sample with a better match in a situation where the acceptably matching sample does not match to the accepted color value to within a pre-designated tolerance relative to the objective function.

16. A method of spectral gamut mapping a color value in a color space for a device having a spectral gamut, the method comprising:
designating a set of samples spanning the spectral gamut by specifying plural device values in a device color space;
generating a spectral reflectance array for each sample in the set of samples using the device value corresponding to the sample;
generating a colorimetric value for each sample by transforming each spectral reflectance array corresponding to the sample under a reference illuminant, wherein the colorimetric value includes a lightness in a lightness dimension, a chroma in a chroma dimension and a hue in a hue dimension;
subdividing the set of samples into subdivisions based on the lightness, the chroma and the hue of the samples such that the number of samples in each subdivision is limited by a predetermined number;
accepting the color value in the color space;
converting the color value into a colorimetric value under the reference illuminant, wherein the converted colorimetric value includes a lightness in the lightness dimension, a chroma in the chroma dimension and a hue in the hue dimension;
identifying subdivisions of the set of samples which fall within a tolerance of the converted colorimetric value by using the lightness, the chroma and the hue of the converted colorimetric value; and
searching the samples within the identified subdivisions so as to find a sample that matches acceptably to the accepted color value relative to an objective function.

17. A method according to claim 16, wherein the device is a printer and the designating step includes restricting a maximum number of inks to be used out of a total number of inks available when printing a color.

18. A method according to claim 16, wherein said generating a spectral reflectance array for each sample includes processing the device value through a forward spectral device model for the device.

19. A method according to claim 16, wherein the subdividing step includes subdividing the set of samples into subdivisions based on a neutral spine and hue leaves in a lightness-chroma-hue (LCh) space.

20. A method according to claim 16, wherein in each subdivision there are approximately the same number of samples as in all other subdivisions.

21. A method according to claim 16, wherein in each subdivision there are at least a second predetermined number of samples.

22. A method according to claim 16, further comprising:
generating one or more colorimetric attributes for each sample in the set of samples, wherein a colorimetric attribute includes a colorimetric value under an illuminant, a color inconstancy index from an illuminant to a reference illuminant, or a combination of multiple such colorimetric attributes.

23. A method according to claim 16, wherein the converting step includes a colorimetric gamut mapping of the converted colorimetric value if the converted colorimetric value is outside a colorimetric gamut of the device.

24. A method according to claim 16, wherein the searching step includes calculating objective function results for the samples in the identified subdivisions in parallel.

25. A method according to claim 16, wherein the searching step includes finding a sample in the identified subdivisions yielding the lowest result for the objective function.

26. A method according to claim 16, wherein the objective function is equal to a maximum value among multiple values resulting from a color difference equation evaluated under multiple illuminants for the accepted color value and for the spectral reflectance array of a given sample in one of the identified subdivisions.

27. A method according to claim 16, wherein the objective function is equal to a maximum value among multiple values resulting from a color inconstancy index evaluated from multiple illuminants to the reference illuminant for the spectral reflectance array of a given sample in one of the identified subdivisions.

28. A method according to claim 16, wherein the searching step includes finding admissible samples in the identified subdivisions which yield a color difference within a threshold between the accepted color value and a spectral reflectance array of a given sample under the reference illuminant, and wherein the searching step further includes finding an acceptably matching sample out of the admissible samples which yields the lowest result for the objective function.

29. A method according to claim 16, further comprising designating new samples by specifying new device values in the device color space that are within a neighborhood of the device value of the sample that matches acceptably to the accepted color value, and searching among the new samples for a sample with a better match in a situation where the acceptably matching sample does not match to the accepted color value to within a pre-designated tolerance relative to the objective function.

30. A color management module stored on a non-transitory computer-readable memory medium which when executed by a computer performs spectral gamut mapping of a color value in a color space for a device during an on-line phase, wherein a spectral gamut of the device is determined during an off-line phase by constructing plural subdivisions of a set of samples spanning the spectral gamut, the color management module comprising:
  an accepting module constructed to accept the color value in the color space;
  a converting module constructed to convert the color value into a colorimetric value under a reference illuminant, wherein the converted colorimetric value includes a lightness in a lightness dimension, a chroma in a chroma dimension and a hue in a hue dimension;
  an identifying module constructed to identify subdivisions of the set of samples which fall within a tolerance of the converted colorimetric value by using the lightness, the chroma and the hue of the converted colorimetric value;
  whereby the subdivisions are constructed during the off-line phase which designates the set of samples by specifying plural device values in a device color space, generates a spectral reflectance array for each sample, generates a colorimetric value for each sample by transforming the spectral reflectance array corresponding to the sample under the same reference illuminant used during the on-line phase, wherein each colorimetric value includes a lightness in the lightness dimension, a chroma in the chroma dimension and a hue in the hue dimension, and wherein the set of samples are subdivided based on their lightness, chroma and hue such that the number of samples in each subdivision is limited by a predetermined number; and
  wherein the color management module further comprises:
  a searching module constructed to search the samples within the identified subdivisions so as to find a sample that matches acceptably to the accepted color value relative to an objective function.

31. A color management module according to claim 30, wherein the searching module is further constructed to calculate objective function results for the samples in the identified subdivisions in parallel.

32. A color management module according to claim 30, wherein the searching module is further constructed to find a sample in the identified subdivisions yielding the lowest result for the objective function.

33. A color management module according to claim 30, wherein the objective function is equal to a maximum value among multiple values resulting from a color difference equation evaluated under multiple illuminants for the accepted color value and for the spectral reflectance array of a given sample in one of the identified subdivisions.

34. A color management module according to claim 30, wherein the objective function is equal to a maximum value among multiple values resulting from a color inconstancy index evaluated from multiple illuminants to the reference illuminant for the spectral reflectance array of a given sample in one of the identified subdivisions.

35. A color management module according to claim 30, wherein the searching module is further constructed to find admissible samples in the identified subdivisions which yield a color difference within a threshold between the accepted color value and a spectral reflectance array of a given sample under the reference illuminant, and wherein the searching module is further constructed to find an acceptably matching sample out of the admissible samples which yields the lowest result for the objective function.

36. A color management module according to claim 30, wherein the searching module is further constructed to designate new samples by specifying new device values in a device color space that are within a neighborhood of the device value of the sample that matches acceptably to the accepted color value, and wherein the searching module is further constructed to search among the new samples for a sample with a better match in a situation where the acceptably matching sample does not match to the accepted color value to within a pre-designated tolerance relative to the objective function.

37. A color management apparatus comprising:
  a computer-readable memory constructed to store computer-executable process steps; and
  a processor constructed to execute the computer-executable process steps stored in the memory;
  wherein the process steps stored in the memory cause the processor to determine a spectral gamut of a device during an off-line phase by constructing plural subdivisions of a set of samples spanning the spectral gamut, and wherein the process steps include computer-executable process steps to:
  designate the set of samples by specifying plural device values in a device color space;
  generate a spectral reflectance array for each sample using the device value corresponding to the sample;
  generate a colorimetric value for each sample by transforming the spectral reflectance array corresponding to the sample under a reference illuminant, wherein the colorimetric value includes a lightness in a lightness dimension, a chroma in a chroma dimension and a hue in a hue dimension; and
  subdivide the set of samples into subdivisions based on the lightness, the chroma and the hue of the samples such that the number of samples in each subdivision is limited by a predetermined number,
  whereby in an on-line phase of spectral gamut mapping, subdivisions are identified that contain samples that are candidates for an acceptable match to an input color value which is given in the on-line phase, and an acceptably matching sample from the candidate samples in the identified subdivisions is determined relative to an objective function.

38. A color management apparatus comprising:
  a computer-readable memory constructed to store computer-executable process steps; and
  a processor constructed to execute the computer-executable process steps stored in the memory;
  wherein the process steps stored in the memory cause the processor to spectrally gamut-map a color value in a color space for a device during an on-line phase, wherein a spectral gamut of the device is determined during an off-line phase by constructing plural subdivisions of a set of samples spanning the spectral gamut, and wherein the process steps include computer-executable process steps to:
  accept the color value in the color space;
  convert the color value into a colorimetric value under a reference illuminant, wherein the converted colorimetric value includes a lightness in a lightness dimension, a chroma in a chroma dimension and a hue in a hue dimension;

identify subdivisions of the set of samples which fall within a tolerance of the converted colorimetric value by using the lightness, the chroma and the hue of the converted colorimetric value;

whereby the subdivisions are constructed during the off-line phase which designates the set of samples by specifying plural device values in a device color space, generates a spectral reflectance array for each sample, generates a colorimetric value for each sample by transforming the spectral reflectance array corresponding to the sample under the same reference illuminant used during the on-line phase, wherein each colorimetric value includes a lightness in the lightness dimension, a chroma in the chroma dimension and a hue in the hue dimension, and wherein the set of samples are subdivided based on their lightness, chroma and hue such that the number of samples in each subdivision is limited by a predetermined number; and wherein the process steps stored in the memory further include a computer-executable process step to:

search the samples within the identified subdivisions so as to find a sample that matches acceptably to the accepted color value relative to an objective function.

39. A non-transitory computer-readable memory medium on which is stored computer-executable process steps for causing a computer to determine a spectral gamut of a device during an off-line phase by constructing plural subdivisions of a set of samples spanning the spectral gamut, the process steps comprising:

designating the set of samples by specifying plural device values in a device color space;

generating a spectral reflectance array for each sample using the device value corresponding to the sample;

generating a colorimetric value for each sample by transforming the spectral reflectance array corresponding to the sample under a reference illuminant, wherein the colorimetric value includes a lightness in a lightness dimension, a chroma in a chroma dimension and a hue in a hue dimension; and subdividing the set of samples into subdivisions based on the lightness, the chroma and the hue of the samples such that the number of samples in each subdivision is limited by a predetermined number, whereby in an on-line phase of spectral gamut mapping, subdivisions are identified that contain samples that are candidates for an acceptable match to an input color value which is given in the on-line phase, and an acceptably matching sample from the candidate samples in the identified subdivisions is determined relative to an objective function.

40. A non-transitory computer-readable memory medium on which is stored computer-executable process steps for causing a computer to spectrally gamut-map a color value in a color space for a device during an on-line phase, wherein a spectral gamut of the device is determined during an off-line phase by constructing plural subdivisions of a set of samples spanning the spectral gamut, the process steps comprising:

accepting the color value in the color space;

converting the color value into a colorimetric value under a reference illuminant, wherein the converted colorimetric value includes a lightness in a lightness dimension, a chroma in a chroma dimension and a hue in a hue dimension;

identifying subdivisions of the set of samples which fall within a tolerance of the converted colorimetric value by using the lightness, the chroma and the hue of the converted colorimetric value;

whereby the subdivisions are constructed during the off-line phase which designates the set of samples by specifying plural device values in a device color space, generates a spectral reflectance array for each sample, generates a colorimetric value for each sample by transforming the spectral reflectance array corresponding to the sample under the same reference illuminant used during the on-line phase, wherein each colorimetric value includes a lightness in the lightness dimension, a chroma in the chroma dimension and a hue in the hue dimension, and wherein the set of samples are subdivided based on their lightness, chroma and hue such that the number of samples in each subdivision is limited by a predetermined number; and wherein the process steps further comprise:

searching the samples within the identified subdivisions so as to find a sample that matches acceptably to the accepted color value relative to an objective function.

* * * * *